United States Patent [19]

Hosaka et al.

[11] E Re. 31,582

[45] Reissued May 8, 1984

[54] AUTOMATIC CONTROL SYSTEM FOR METHOD AND APPARATUS FOR CHECKING DEVICES OF AN AUTOMOTIVE VEHICLE IN USE WITH A MICROCOMPUTER

[75] Inventors: Akio Hosaka, Yokohama; Kazuhiro Higashiyama, Atsugi, both of Japan

[73] Assignee: Nissan Motor Company, Limited, Yokohama, Japan

[21] Appl. No.: 424,628

[22] Filed: Sep. 29, 1982

Related U.S. Patent Documents

Reissue of:

[64] Patent No.: 4,339,801
Issued: Jul. 13, 1982
Appl. No.: 132,647
Filed: Mar. 21, 1980

[30] Foreign Application Priority Data

Mar. 23, 1979 [JP] Japan ..... 54-33880

[51] Int. Cl.[3] ..... G06F 11/00

[52] U.S. Cl. ..... 364/431.04; 123/417; 123/480; 364/424; 371/16; 371/20; 371/21

[58] Field of Search ..... 364/431.04, 424; 371/16, 20, 21; 123/417, 480

[56] References Cited

U.S. PATENT DOCUMENTS

| | | | |
|---|---|---|---|
| 3,838,264 | 9/1974 | Maker | 371/21 |
| 4,034,194 | 7/1977 | Thomas et al. | 371/20 |
| 4,044,634 | 8/1977 | Florus et al. | 74/886 |
| 4,072,850 | 2/1978 | McGlynn | 364/424 |
| 4,108,358 | 8/1978 | Niemasyk et al. | 371/20 |
| 4,122,996 | 10/1978 | Wilczek | 371/20 |
| 4,127,768 | 11/1978 | Negi et al. | 371/16 |
| 4,138,723 | 2/1979 | Nehmer et al. | 364/424 |
| 4,150,428 | 4/1979 | Inrig et al. | 371/10 |
| 4,158,431 | 6/1979 | Van Bavel et al. | 371/20 |
| 4,191,996 | 3/1980 | Chesley | 371/10 |
| 4,208,929 | 6/1980 | Heino et al. | 74/731 |
| 4,245,314 | 1/1981 | Henrich et al. | 364/431 |
| 4,245,315 | 1/1981 | Barman et al. | 364/431 |
| 4,255,789 | 3/1981 | Hartford et al. | 364/431 |
| 4,269,281 | 5/1981 | Schneider et al. | 180/70 R |

FOREIGN PATENT DOCUMENTS

| | | |
|---|---|---|
| 7775 | 7/1979 | European Pat. Off. . |
| 6033 | 12/1979 | European Pat. Off. . |
| 8495 | 3/1980 | European Pat. Off. . |
| 13103 | 7/1980 | European Pat. Off. . |
| 2338122 | 2/1975 | Fed. Rep. of Germany . |
| 2363801 | 6/1975 | Fed. Rep. of Germany . |
| 2756719 | 7/1978 | Fed. Rep. of Germany . |
| 2726115 | 12/1978 | Fed. Rep. of Germany . |
| 2323028 | 4/1977 | France . |
| 2385902 | 10/1978 | France . |
| 2415711 | 8/1979 | France . |
| 2417689 | 9/1979 | France . |
| 2453443 | 10/1980 | France . |
| 2456648 | 12/1980 | France . |
| 1437217 | 5/1976 | United Kingdom . |
| 1459851 | 12/1976 | United Kingdom . |
| 1480520 | 7/1977 | United Kingdom . |
| 1504096 | 3/1978 | United Kingdom . |
| 2007397 | 5/1979 | United Kingdom . |

OTHER PUBLICATIONS

"Multiplexage pour Cablage Automobile," by J. R. Massoubre et al (1980), pp. 39–51.

"Antiblockiersystem (ABS) fur Personenkraftwagen", Bosch Technische Berichte by Von Heinz Leiber, et al (1980), pp. 65–94.

"Microprocessor Transmission Controls" from 28th IEEE Vehicular Technology Conference, by Dr. W. R. Hill (1978), pp. 361–365.

"Automobile Electronics for 1980", Product Engineering, vol. 50, No. 9 (1979), pp. 69–71.

"Mikrocomputer in Komplexen Automobilanwendungen", Automobil-Elektronik by Horst Huse-1978, pp. 78–82.

"Management von Mikroprozessor-Schnittstellen . . . ", Automobil-Elektronik, by David K. Long-1978, pp. 69–72.

*Primary Examiner*—Charles E. Atkinson

*Attorney, Agent, or Firm*—Schwartz, Jeffery, Schwaab, Mack, Blumenthal & Koch

[57] ABSTRACT

An automatic control system for an automotive vehicle in use with a microcomputer has a checking system for checking an input unit, a ROM, a RAM and an output unit of the microcomputer. The checking system comprises a means which stores various checking programs to be executed for checking above-mentioned elements of the microcomputer. The checking system effectively operates to check the elements without causing expanding of duration of execution of the checking programs.

9 Claims, 19 Drawing Figures

AUTOMATIC CONTROL SYSTEM FOR METHOD AND APPARATUS FOR CHECKING DEVICES OF AN AUTOMOTIVE VEHICLE IN USE WITH A MICROCOMPUTER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to a control system including a digital computer or microcomputer system being capable of being mounted on an automotive vehicle for controlling various vehicle devices. More particularly, the present invention relates to a method and means for checking elements of the control system, after the control system has been assembled.

2. Background of the Invention

As is known to those skilled in the art, in recent years, it has become quite popular to control various vehicle systems automatically by using *a* control system including a microcomputer unit. The control system is employed in an automotive vehicle for automatically controlling driving of the internal combustion engine, ignition system, exhaust gas recirculation system, fuel injection system and so on. The control system may be further utilized for controlling various vehicle indicators, such as, for example, a navigation meter. Further, the control system is also used for controlling various vehicle equipment, such as an automatic tuning device for a radio receiver of vehicle mounted type.

The control system generally comprises a central processing unit (CPU), an input unit, an output unit and one or more memory units including read-out memory (ROM) and random access memory (RAM). These elements form a microcomputer for processing data inputted thereinto for outputting control signals to the various vehicle devices. For performing control operation, control programs [which] are generally stored in the ROM and read out and executed in the CPU with respect to input data inputted through the input unit. Result of execution of the control program is outputted to vehicle devices to be controlled through an output unit. In order to satisfactorily control the vehicle devices, correct and accurate function of each element will naturally be required:

the input unit should input signals and read out accurately identical data contained in the input signals;

the RAM should be capable of storing data accurately identical to the data inputted therein and reading out the stored data which should be identical to the data inputted;

the RAM should be capable of keeping storage as preset therein and being read out as is; and in respect to the output unit, it should be capable of inputting output data inputted from the CPU and outputting the data as is.

For the purpose of checking the control system and for preventing the vehicle from serious trouble caused thereon due to error of the control system and from accidents, checking of functions of the elements of the control system will be required.

The control circuit of the control system determines a change in output signals in response to an input signal or to an elapsed time interval. This function of the control system is substantially the same as that of conventional analog control systems. Therefore, as with conventional analog control circuits, it is possible to check the functions of the control circuit by changing the input signals, and observing the changes in the output signals in response to the input changes, and checking whether a certain relation holds between the observations. However, for the reasons described below the time required for such checking is long, and it is not possible to check all functions perfectly.

(1) It is practice in the conventional analog control circuit to check two extreme values of a function and assume the continuity of the interval between those extreme values. Meanwhile, as in the control system employing a microcomputer therein, binary digital signals are used, and thus, the signals are not continuous and have no relationship with one another. Therefore, it is impossible to perform checking as in the analog case. Now consider the relation between the value of input x and the value of output y in both digital and analog cases for a simple analog function $y=0.5x+1.5$. In the analog case, for such a simple function the method employing an operational amplifier to give a zero point and a gain is widely used. In this case, the output is checked when the input is minimum, and the output is also checked when the input is maximum. Because the relation is linear in the analog case, the outputs for all the other input values are assured. If the circuit malfunctions one or other of the end values will be in error. In the digital case, a table look-up is widely used as a means for providing such a function. In this method, output data corresponding to input values 0, 1, 2 . . . is stored in advance, and according to the input value the corresponding output value is retrieved and output. In this case, even if the data corresponding to the minimum and maximum output values is correct, the data corresponding to other input values is not assured. It is therefore necessary to check the data for all input values. For this reason, although for conventional analog circuits it was satisfactory to check two values, for digital circuits the number of checking points has to be increased enormously.

(2) Because it is difficult to observe the state of the signals within the control circuit it is not possible to make an accurate check. For example, in the type of case described above where a simple relation holds directly between the input and output, by increasing the number of checking points it is possible to make a check after a fashion, but when the calculation is used at an intermediate point in the circuit a check is not possible. In other words, in the analog case, if test terminals are provided at the input and output points of the circuit, by measuring the voltages on these terminals it is possible to make a check, but in the digital case since a single line is used to indicate many different signals by time slicing, fitting test terminals is of no use, and in practice it is not feasible to detach a single section to test it. Thus the detailed internal operation of the control circuit cannot be tested, and an accurate complete check is not possible. If the circuit is constructed with LSI techniques it may not even be possible to fit checking terminals.

(3) Because a circuit for an automotive vehicle control device is required to be resistant to vibration, it is not possible to construct the circuit using IC sockets and so forth to mount the elements of the circuit. An IC socket is a device to mount an IC on a printed circuit board and thus by using IC sockets, it is possible to remove the IC from the printed circuit board very simply. Thus for devices which do not require any resistance to vibration, by using IC sockets, even after the device is assembled, the ICs can be detached and tested individually with test equipment, but for control devices for use in an automotive vehicle, resistance to vibration is extremely important. For this reason IC sockets, which allow the possibility of unsatisfactory electrical contact caused by vibration, cannot be used. Therefore methods involving the separate testing of elements of the circuit after assembly, are not applicable.

(4) Control circuits for use in automotive vehicles require resistance to water and moisture, and therefore after assembly the surface of the circuit is encased in a waterproof membrane. Therefore checking devices such as logic analysers cannot be used. A logic analyser is a device for observing the movement of many digital signals on a data bus and so forth, and allows the observation of the status of the input and output data of the CPU for example. If a logic analyser is used, the type of control operation described in (2) above can be measured and observed to a certain extent, but when the surface is covered with a waterproof [profective] *protective* membrane of silicone or epoxy resin in order to increase the resistance to water and moisture, such a checking device cannot be connected, and thus cannot be used.

For the above described reasons, for a control device for a motor vehicle which performs digital control on a large scale using for example a microcomputer, testing after assembly takes a long time, and moreover only an unsatisfactory check can be made.

Then, for similar reasons, once the device is handed over to the user, it is not possible to check whether the control circuit is correctly carrying out the actual processes used in the application. Thus, it is not possible to check for faults when carrying out inspection or servicing of the vehicle.

The object of the present invention is to provide a control device for use in an automotive vehicle which, in order to overcome the above described defects of conventional control devices for use in an automotive vehicle, allows a check program different from the normal control program to be connected to the controlling CPU, and starts the check program when certain predetermined conditions occur, so that the control program automatically checks each function of the control circuit and outputs the results, thus allowing the functions to be tested simply and in a short time after the control device is assembled.

SUMMARY OF THE INVENTION

Therefore, it is an object of the present invention to provide a control system for controlling various automotive vehicle devices having a means for allowing a check of the functions of each element of the system even after the system is assembled.

Another object of the present invention is to provide a checking means capable of being connected to the control system, which means is operative in response to specific vehicle driving condition.

A further object of the present invention is to provide a control system for an automotive vehicle which is provided with a function for checking an input unit.

A further object of the present invention is to provide a control system for an automotive vehicle which is provided with a function for checking a RAM.

A further object of the present invention is to provide a control system for an automotive vehicle which is provided with a function for checking a ROM.

A further object of the present invention is to provide a control system for an automotive vehicle which is provided with a function for checking an output unit.

A still further object of the present invention is to provide a control system including a control program having various subroutines for checking the input unit, the RAM, the ROM and the output unit as interrupt subroutines.

A still further object of the present invention is to provide a method for checking the functions of each element of the control system, which method is capable of checking the control system effectively and perfectly.

Other objects and advantages sought in the present invention will become apparent from the description hereinafter.

BRIEF DESCRIPTION OF THE DRAWINGS

The present invention will become more fully understood from the detailed description given below, and the accompanying drawings of the preferred embodiment of the present invention, which, however, are not to be taken as limitative of the present invention in any way, but are for the purpose of elucidation and explanation only.

In the drawings.

DESCRIPTION OF THE PREFERRED EMBODIMENT

Figure 1:
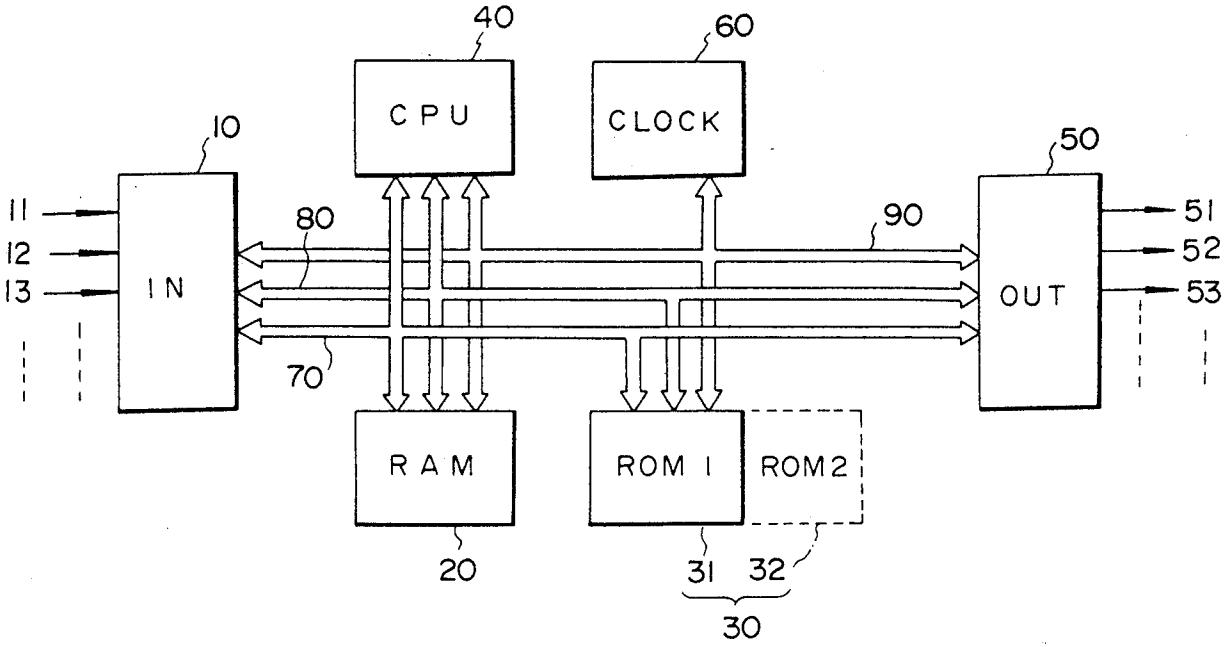
FIG. 1 is a schematic block diagram of the general construction of a control system for an automotive vehicle, having a microcomputer to which a means for checking the functions in accordance with the present invention can be applied.

Referring now to the drawings, particularly to FIG. 1, there is illustrated a general construction of a preferred embodiment of a control system employing a microcomputer which includes a central processing unit (CPU), a random access memory (RAM) and one or more read-only memories (ROM). The control system is mounted in an automotive vehicle for controlling various vehicle devices, such as for example, engine operation, the fuel injection system, ignition system and so on. Further, the control system controls various kinds of meters or indicators provided on the vehicle and also controls vehicle equipment such as a radio receiver and so on. For performing the control operations, various sensors or [detector] *detectors* provide input signals through an input unit to be processed in the CPU. In FIG. 1, input unit 10 may generally comprise, for example, a noise elimination circuit, a shaping circuit, such as, for example, a waveform shaping filter, [or and] *and/or* a level convertor. The noise elimination circuit may comprise, for example, a means for checking a noise level contained in the input signal. For example, such a means for checking a noise level of the input signal may include a discriminator in which the input signal is compared with a reference signal generated by a signal generating means provided outside the system. When the input signal contains noise that may possibly cause a malfunction in the control system, the input signal is not used to update an input-register from which input data is taken for controlling the vehicle driving means or other vehicle equipment. Such noise elimination is frequently necessary in using a sensor signal from a sparking sensor provided in an ignition system, for example. Input signals 11, 12, 13 . . . are inputted to the input unit 10 wherein noise is eliminated, the waveforms shaped and the voltage levels, converted as required. It will be appreciated that the input signals are of various forms, such as ON-OFF signals, pulse signals and analog signals. Between the signal sources and the input unit 10, there will be provided various convertors for converting various types of signals into appropriate digital signals; for example, analog-to-digital convertors, multiplex units and the like. When various signals are used, each input signal is inputted in synchronism with a synchronising signal. Before being inputted to the input unit 10, the input signals 11, 12, 13 . . . are converted or encoded into digital signals as follows:

when the input signal is an ON-OFF signal, the signal is converted into a digital signal, such as the ON signal to a logic "1" the OFF signal to a logic "0";

when the input signal is a pulse signal, the pulse-frequency is counted with reference to a reference gate time or a pulse length is measured with reference to reference pulses to convert the pulse into digital code;

when the input signal is a pulse code signal, the signal is converted by means of a pulse-to-code convertor;

when the input signal is an analog signal, the analog signal is converted by means of a analog-digital convertor (A/D convertor).

It will be appreciated that the input signal is sometimes inputted as a digital-code signal directly applicable to the digital computing system (microcomputer). In this case, the input signal will be sent on to the next step without modification.

The input signals 11, 12, 13 . . . are then stored in an input register which is provided in the input unit 10 or are written and stored in addresses of a RAM 20 through data bus 80. The address of the RAM 20 is selected or determined by an address signal stored in an index register of a central processing unit (CPU) 50 and inputted to the RAM 20 through an address bus 70. The input signal is written in the input register or in the RAM at specific addresses determined by the address signal, by means of a synchronizing signal supplied by a clock signal generator provided outside the control system. The inputted data written and stored in the RAM 20, is read out and sent to the CPU 50 for performing control [operation] *operations* according to a control program with respect to the data contained therein. The control program is stored in a ROM 30 and is read therefrom on carrying out the control operation of the CPU 50. A result of the operation of the control program of the CPU is sent to an output unit 40. The output unit 40 may include an output register for storing output data therein, if necessary. Since the output data is inputted to the output unit 40 in the form of digital code, the output unit 40 converts the data into ON-OFF signals, pulse signals, analog signals or pulse-code signals to provide outputs according to the type of the control device to be operated by the output signal. The output data is then amplified to generate output signals 51, 52, 53 . . . Each output signal 51, 52, 53 . . . is then transmitted to an actuator which operates a control device for a device to be controlled or to an indicator. A high frequency oscillation circuit 60 (CLOCK), such as a crystal oscillator, generates a basic signal; either this signal, or a signal whose frequency is a submultiple of the basic signal is used as a clock signal to be inputted through a control bus 90 to the above-mentioned circuits, for example, the CPU 50, for controlling same. Although this is not shown in the drawings, the control bus 90 is also connected to a read/write signal generator.

Although the recently developed microcomputers are generally constructed as above, there are various possibilities for the arrangement of components of elements therein; for example, there may be an element including the CPU, RAM and OSC as a combined unit, and further there may be another element including a ROM, and part of the input and output units. Further, the combined elements can be varied in the numbers thereof, or some unnecessary elements, for example, the input unit or RAM, can be omitted from the system. Therefore, it should be noted that the present invention can be applied to various constructions of the control system and although a specific construction of the microcomputer has been disclosed hereinabove, the present invention should not be considered as [limitated] *limited* to the specific construction of the control system. The above-mentioned control system will be also applicable for controlling various types of vehicle equipment mounted in an automotive vehicle; for example, an internal combustion engine, transmission, braking system, radio or indicators. Further, the control system is applicable, for example for controlling operations of the ignition system and/or fuel injection system in response to driving condition.

The ROM 30 holds a control program for control operation of the CPU 40 stored in the control-data storage location ($ROM_1$=31) and a checking program for checking elements of the control system, stored in the checking data storage location ($ROM_2$=32). The storage locations 31 and 32 may be in a position either combined as one component or separated into two areas.

FIG. 1 shows a control system including a microcomputer. In FIG. 1, the ROM 30 is composed of two portions $ROM_1$ 31 and $ROM_2$ 32[;]. The $ROM_2$ 32 is shown by a broken line to indicate that it may be provided separately from the control system. For example, all or part of the checking program and checking data can be stored in a memory unit provided outside the system and connected by means of an IC socket or connector which is releasably connected to the system in general. For example, the IC socket or connector is connected with an external ROM provided outside the system. In such cases the data bus, address bus and control bus are provided to connect to the IC socket or connector to the CPU in order to send data stored in the external ROM to CPU 40. The control system according to the present invention can be embodied in any one of the above-mentioned forms. If the ROM 30, comprising the $ROM_1$ 31 and $ROM_2$ 32, is included in the microcomputer system, it will enable the checking operation to be carried out anywhere and at any time simultaneous with running of the control program. Therefore, it is unnecessary to decide whether the checking program shall be run. On the other hand, if the ROM 30 is provided separately from the control system, manufacturing cost can be reduced since $ROM_2$ 32 is not required in the system.

Figure 2:
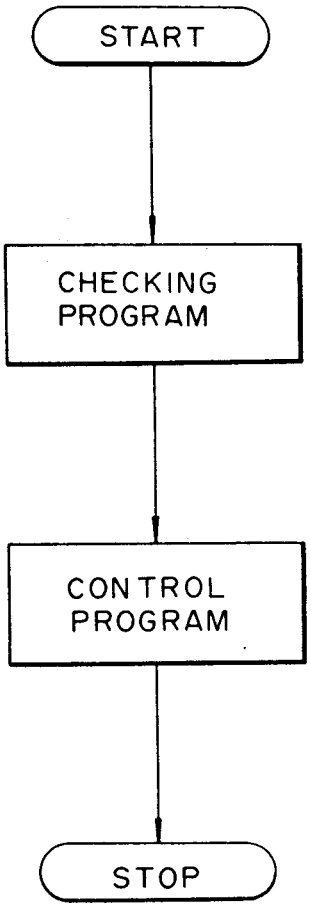
FIG. 2 is a schematic flowchart of a method of executing a checking program for use with the checking means of the present invention.
Figure 3:
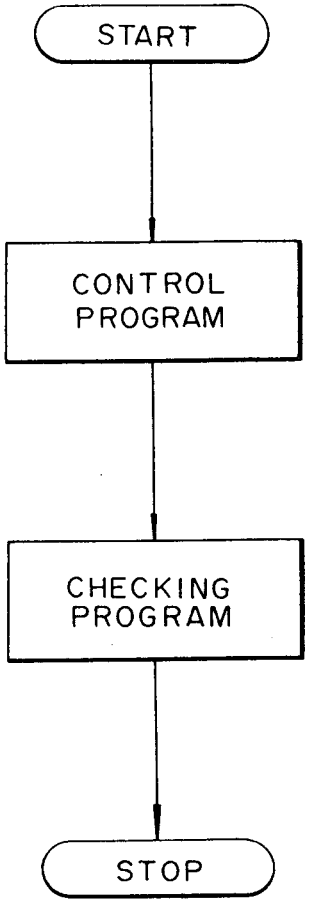
FIG. 3 is a schematic flowchart of another method of executing a checking program for use with the checking means of the present invention.
Figure 4:
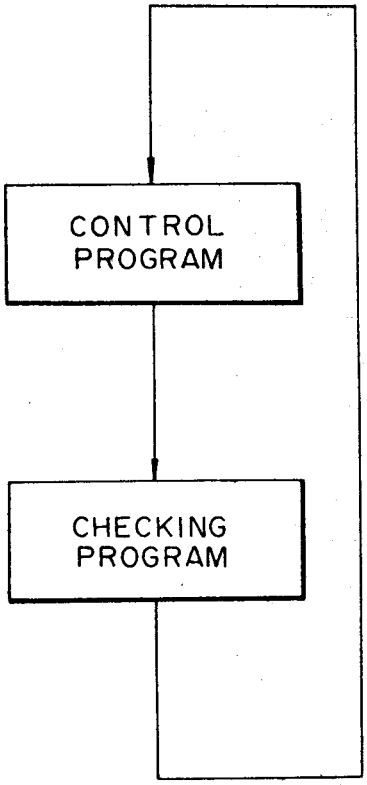
FIG. 4 is a schematic flowchart of a further method executing a checking program for use with the checking means of the present invention.
Figure 5:
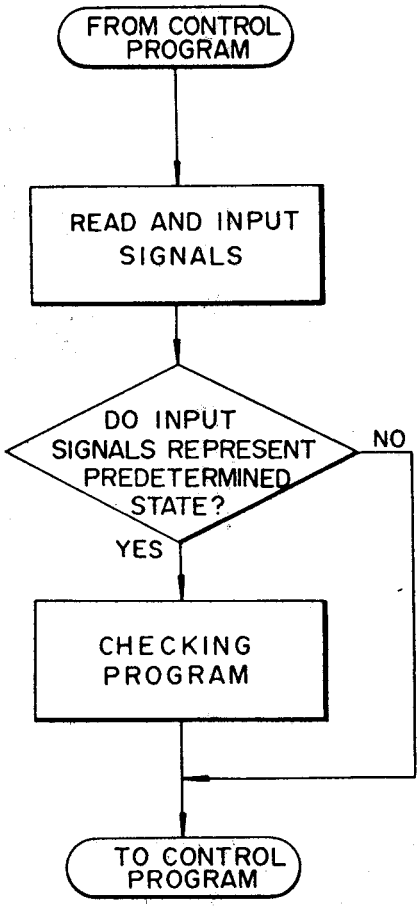
FIG. 5 is a schematic flowchart of an other method of executing a checking program for use with the checking means of the present invention.

The checking programs are run or executed on the CPU 40 when the control system is in a predetermined state. Some examples of schematic flowcharts will now be explained with reference to FIGS. 2 to 5. In FIG. 2 the checking program is run immediately after switching to start and before running the control program in the sequence of the control system. As shown in FIG. 3, the order of running the checking program and the control program can be changed from the order shown in FIG. 2. In FIG. 4, the checking program and the control program loop together. Therefore, in this case, the two programs are run alternately. In the above-mentioned three examples, when the control program is run, the checking program is always run before or after running the control program. In these cases, it is not necessary to determine whether the checking program is run before or after the control program is run or executed, as the checking program is run or executed automatically so as to simplify operation of the control system. It is also possible to arrange for the check program to be executed when the control input signals are put into a particular state. In concrete terms, as shown in the flowchart in FIG. 5, at an intermediate point in the control program, a program is executed to read out the state of the input signals and then check whether the input signals are in the particular state. If the signals are in the particular state, then the check program is executed, otherwise the check program is skipped and the control program is executed again.

As the predetermined particular state, it is preferable to use a time when the controlled devices are not operating. For example, in an engine control device, the amount of control necessary when the engine is stationary is extremely small, and therefore the execution time required for execution of the control program is short. Therefore even if the check program is executed, the response of other control devices is not delayed, which is a desirable feature. Stated alternately, when the results of the checking program are output, even if they are output together with the control output, then, if the engine is stationary, problem-free output of, for example, the ignition control signals is assured, and the number of output circuits can be reduced. Then again, for similar reasons it is possible to detect that the vehicle is stationary and then execute the check program. In such cases it will be satisfactory to take as an input parameter the period or frequency of pulses from a sensor determining the engine rotation rate or the vehicle speed, as for example a rotation pick-up pulse, and check whether or not the engine revolution rate or vehicle speed is zero (or extremely close to zero).

There again it is possible to select a predetermined state which cannot occur in the normal range of operation of control as the particular state. For example, the range of engine speeds used in a normal reciprocating engine is up to about 6000 rpm. Therefore, for example, the check program may be run by generating an input signal corresponding to an engine speed is 9000 rpm or more. In this case, the check program will not be run in the range of normal use. When the check is carried out as described below, check data may be output to the output circuit and the output state changed, or data stored in the RAM may be rewritten; thus there are cases where it is difficult to continue normal control. In these cases it will be best not to carry out checking during normal control. When checks are to be carried out on the control circuit, the operational inputs and outputs will be detached from the control circuit. Input signals such as a pulse signal corresponding to the engine rate, will be input from a separate electrical device for checking purposes. It is straight forward to produce a high frequency pulse signal electrically, so that the checking can be executed simply. Now it is also of advantage for the particular state to input two [state] *states* which cannot possibly occur at the same time, such as two vehicle speeds, high and low temperatures, or for instance signals indicating that the transmission gear position switch is in both top and neutral positions.

Figure 6:
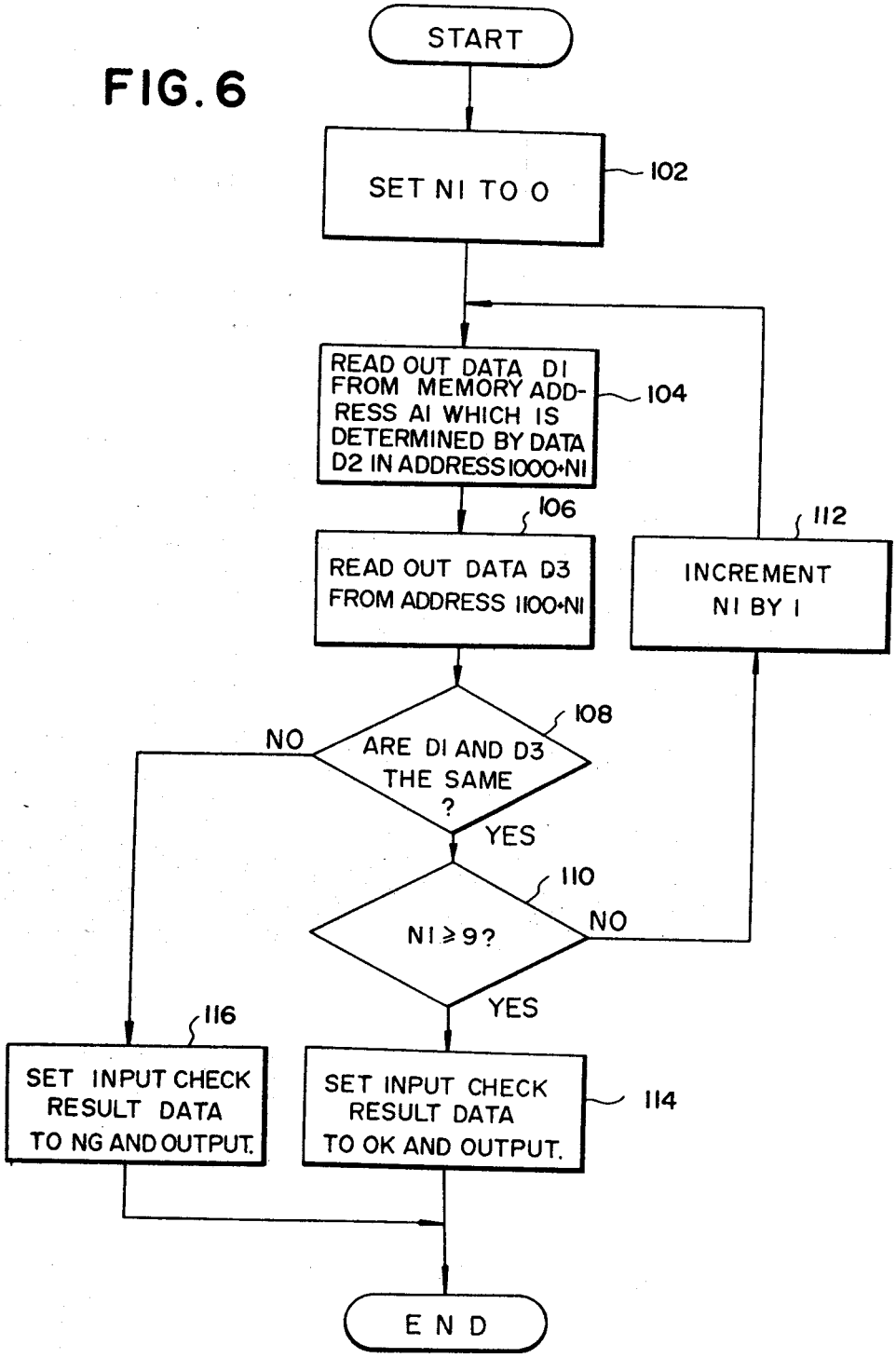
FIG. 6 is a flowchart of one example of an input unit checking program in use with the checking means according to the present invention.

Now referring to FIG. 6, there is generally illustrated and explained the running of the checking programs for checking the input unit 10 of FIG. 1. FIG. 6 shows a flowchart for running the checking program of the input unit 10. It should be noted that an input signal to be processed during running of the checking program is inputted from a checking signal generating means (not shown) which is provided outside the control system of the present invention. Checking of the input signal is done with respect to input data temporarily stored at an address in the input register, for example, sequentially from starting address 1100. The input signals are generated and fed from the checking signal generating means in order adapted to the order of the input data stored in the input register. After starting the checking program, in a first processing step 102, the value $N_1$ of a counter is reset to 0. As will be understood from the drawings, hereinafter disclosed is an example in which ten input data are inputted and stored in the input register in the input unit 10.

Table I shows the relationship between values $D_1$ of input data stored in the address register $A_1$, address data values $D_2$ stored in addresses 1000 to 1009 of the ROM and reference data values $D_3$ stored in addresses 1100 to 1109 of the ROM, as an example.

TABLE I

| Counter | Input Signal No. | $A_1$ | $D_1$ | ROM Address | $D_2$ | ROM Address | $D_3$ |
|---|---|---|---|---|---|---|---|
| 0 | 1 | 10 | 30 | 1000 | 10 | 1100 | 30 |
| 1 | 2 | 12 | 55 | 1001 | 12 | 1101 | 55 |
| 2 | 3 | 14 | 10 | 1002 | 14 | 1102 | 10 |
| 3 | 4 | 15 | 15 | 1003 | 15 | 1103 | 15 |
| 4 | 5 | 16 | 43 | 1004 | 16 | 1104 | 43 |
| 5 | 6 | 18 | 54 | 1005 | 18 | 1108 | 54 |
| 6 | 7 | 20 | 10 | 1006 | 20 | 1106 | 10 |
| 7 | 8 | 24 | 15 | 1007 | 24 | 1107 | 25 |
| 8 | 9 | 26 | 60 | 1008 | 26 | 1108 | 60 |
| 9 | 10 | 28 | 77 | 1009 | 28 | 1109 | 77 |

As seen from Table I, each of the input signal 1 to 10 is stored in address $A_1$ (10, 12 . . . 28) of the input register or RAM 20. Each input data value $D_1$ contained in each input signal 1 to 10 is shown in Table I. In Table I, the input data values $D_1$ are 30, 55 . . . 77. In addresses 1000 to 1009 of the ROM, are stored address values $D_2$ (10, 12 . . . 28); in the addresses 1100 to 1109 of the ROM, are stored reference data values $D_3$ (30, 55 . . . 77). These values are to be compared with the input data values $D_1$ when the checking program is run. On the next processing step 104, the address value $D_2$ (=10) stored at address $1000+N_1$ (=1000) is read out. Then, the input data $D_1$ (=30) stored at the address $A_1$ (=10) of the input register of the RAM corresponding to the read address data $D_2$ is read out. Thereafter, the reference data $D_3$ (=30) stored at the address $1100+N_1$(=1100) is read out in processing step 106. The input data $D_1$ and reference data $D_3$ are compared together in the decision step 108 to decide whether the input data $D_1$ read from the address $A_1$ of the input register on the RAM matches will the corresponding reference data $D_3$. When the input data $D_1$ matches with the reference data $D_3$, the check program goes to the next process step 110 where the count number $N_1$ of the counter is compared with the number of the last input data (=9). In other words, in step 110, a check is made to whether the foregoing checking program has run to completion in checking the input unit with respect to all of the input data values $D_1$. The check is made by comparing the count number $N_1$ with the number of the last input data namely, 9. In the example shown in FIG. 6, the sequence steps 104, 106, 108 and 110 of the checking program repeatedly runs until the count number $N_1$ of the counter is 9. When the count number $N_1$ is less than 9, the checking program returns to process step 104. Prior to this time, however, the counter is incremented by one (1) in process step 112. Namely, after checking of the input unit with respect to the first input data $D_1$, and confirming that the read input data $D_1$ matches with the reference data $D_3$, the count number $N_1$ is incremented by 1 to repeat steps 104–112 of the checking program.

Result of checking operation for the input unit is outputted, when all the input data values $D_1$ read from the input register or the RAM at the process step 102 match with the reference data values $D_3$ stored in the ROM and read out in process step 106. In this time, when the count number $N_1$ of the counter reaches 9, and therefore determines that all the input data values have been compared with the reference data $D_3$ corresponding thereto and match with the latter, the checking program goes to process step 114 where the output signal indicating that the input unit is operating correctly (hereafter referred to as the "OK" signal) is generated and outputted.

The input data value $D_1$ may not always match the reference data value $D_3$. Such a condition is shown in the eighth column of Table I in which input data $D_1$ (15) stored at address $A_1$ (24) of the input register or the RAM and the corresponding reference data $D_3$ (25) do not match. The difference of the input data $D_1$ and the reference data $D_3$ will cause a decision at step 108 to go to process step 116. When the checking program goes to process step 116, an output signal indicating that the input unit is malfunctioning or in error (hereafter referred as the NG signal) is generated and outputted.

As may be apparent from the foregoing descriptions, according to the preferred embodiment of the present invention, the reference data $D_3$ referred to as the checking data for running the checking program is stored in a ROM. The input data for running the checking program is compared with the reference data $D_3$. For the purpose of checking the input unit, the input data $D_1$ is set to the reference data $D_3$. Therefore, if each circuit of the input unit operates or functions correctly, the checking input data $D_1$ which is stored at an address $A_1$ of the input register or the RAM and read therefrom will match with the corresponding reference data $D_3$ which is stored at the corresponding address of the ROM and read out therefrom. Since the difference between the input data $D_1$ and the reference data $D_3$ means that the one or some of the circuits of the input unit are malfunctioning and/or that one or some of them are damaged, the checking can be carried out by way of comparing the input data $D_1$ and the reference data $D_3$. According to the checking program disclosed hereinabove, if the difference between the data is detected during running of the checking program, the NG signal is generated and outputted through the output unit.

It will be appreciated that when the input data is contained in the input signal which is in the form of analog signal or pulse signal, the input data may have some errors or aberration due to a difference of measuring timing or other known reasons. However, such difference between the input data and the reference data will often be in a range in which the difference does not affect or only slightly affects operation of the control system for the vehicle or other equipment of the vehicle. Therefore, in such case, it must be determined whether the input unit is malfunctioning or the unit is damaged by detecting whether the difference between the value of the input data $D_1$ and the value of the corresponding reference data $D_3$ exceeds an allowable range. There may be known various way for checking whether the difference between the values of the input data and the reference data is within the allowable range. However, in the present invention, the data is checked by either including in the checking program discriminating step to determine an allowable range as being within a distance A from the reference data or providing two different reference data one of which defines the upper limit of the allowable range and the other defines the lower limit thereof. In the latter checking method, the input data will be compared with both reference data and checked whether the input data is lower or higher than the lower and upper limits of the allowable range.

Although in the foregoing example there is shown a method or flowchart for checking the input unit by way of checking input signals stored and read from the input register of the input unit and with reference to each reference data value stored and read from an address of the ROM, and both of the data values can be stored in single addresses, input data is not always capable of storage in only one address. Input data is sometimes stored in two or more addresses of the input register or the RAM. In such case, the input data might be 2 or more bytes of data. The word byte is used in the present specification to mean eight binary digits (or bits) of data. In checking all of such data value, theoretically two-hundred fifty-six ($2^8$) different data values may be contained in each data byte. Therefore, if a check is made with respect to all the different data values, it will cause the checking program to run for a considerably long period. If only one of the different data values is checked, it will possibly cause overlook of damage of the input unit due to occasionally matching the input data and the reference data by sheer chance. Therefore, for reducing checking period and for probabilistically avoiding overlook of damage in the input unit, at least two input data values should be checked during running of the checking program; in practice, two or three input data values will be checked.

Figure 7:
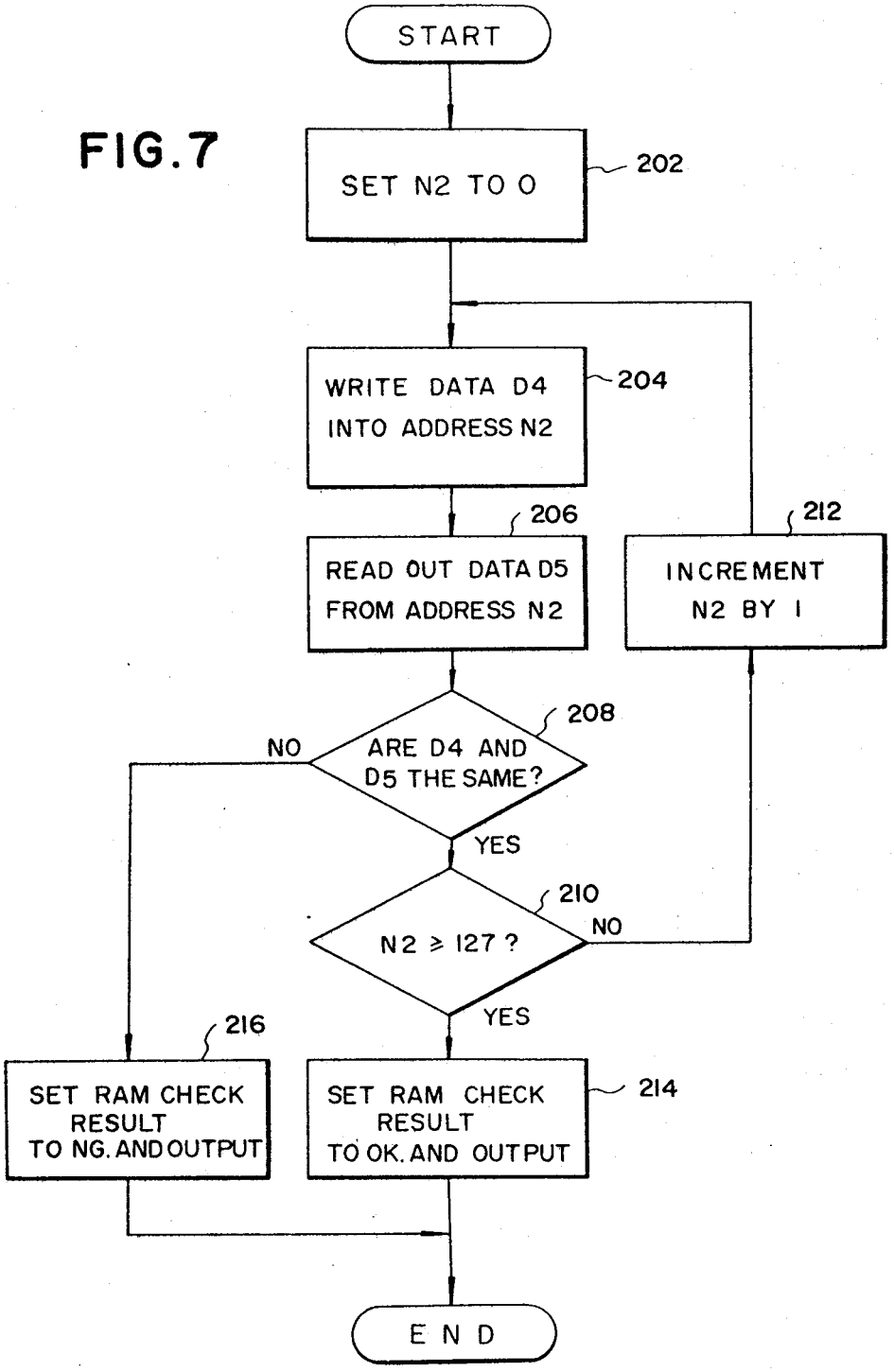
FIG. 7 is a flowchart of one example of a RAM checking program in use with the checking means according to the present invention.
Figure 8:
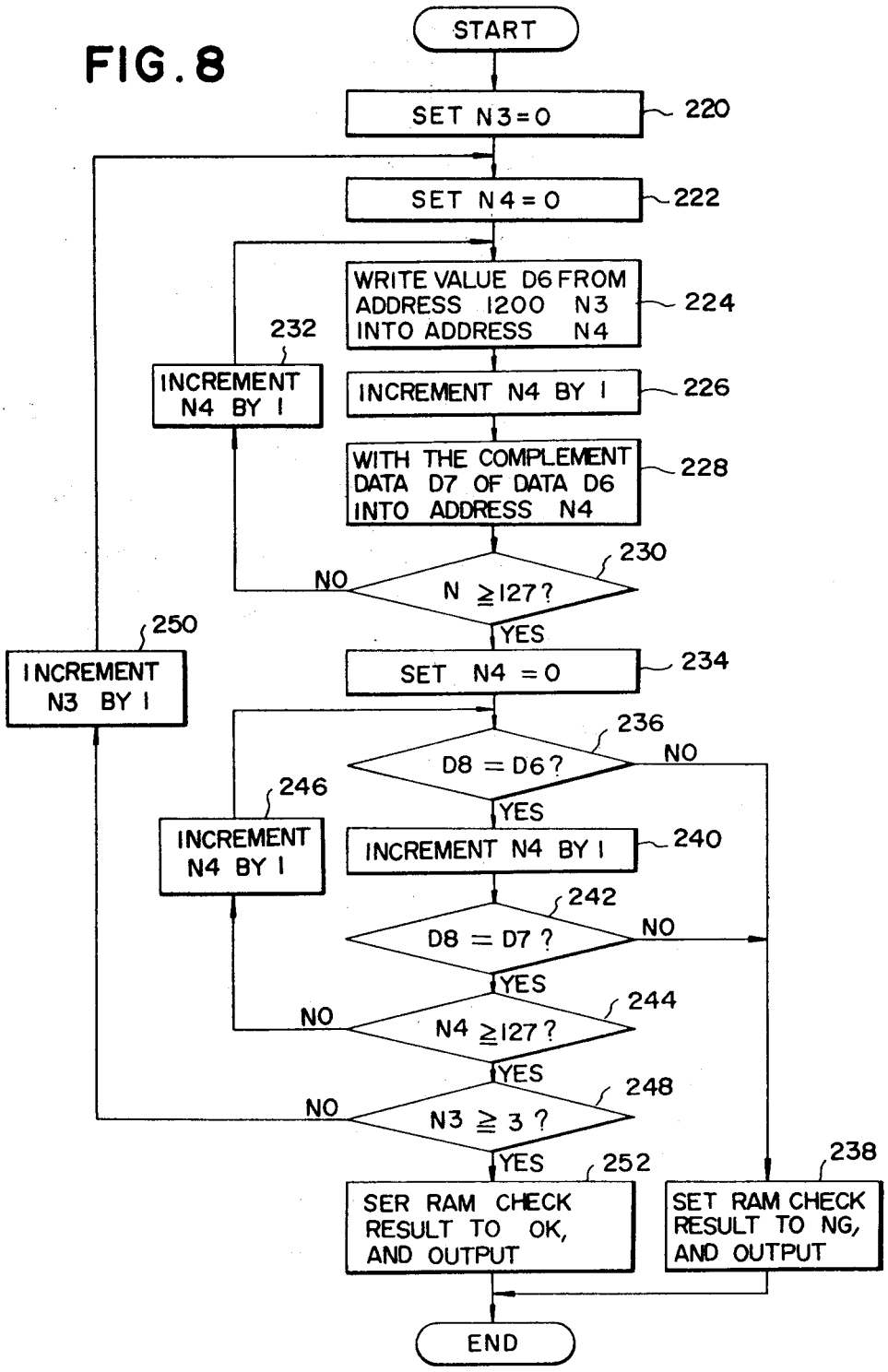
FIG. 8 is a flowchart of a modification of the RAM checking program of FIG. 7.
Figure 9:
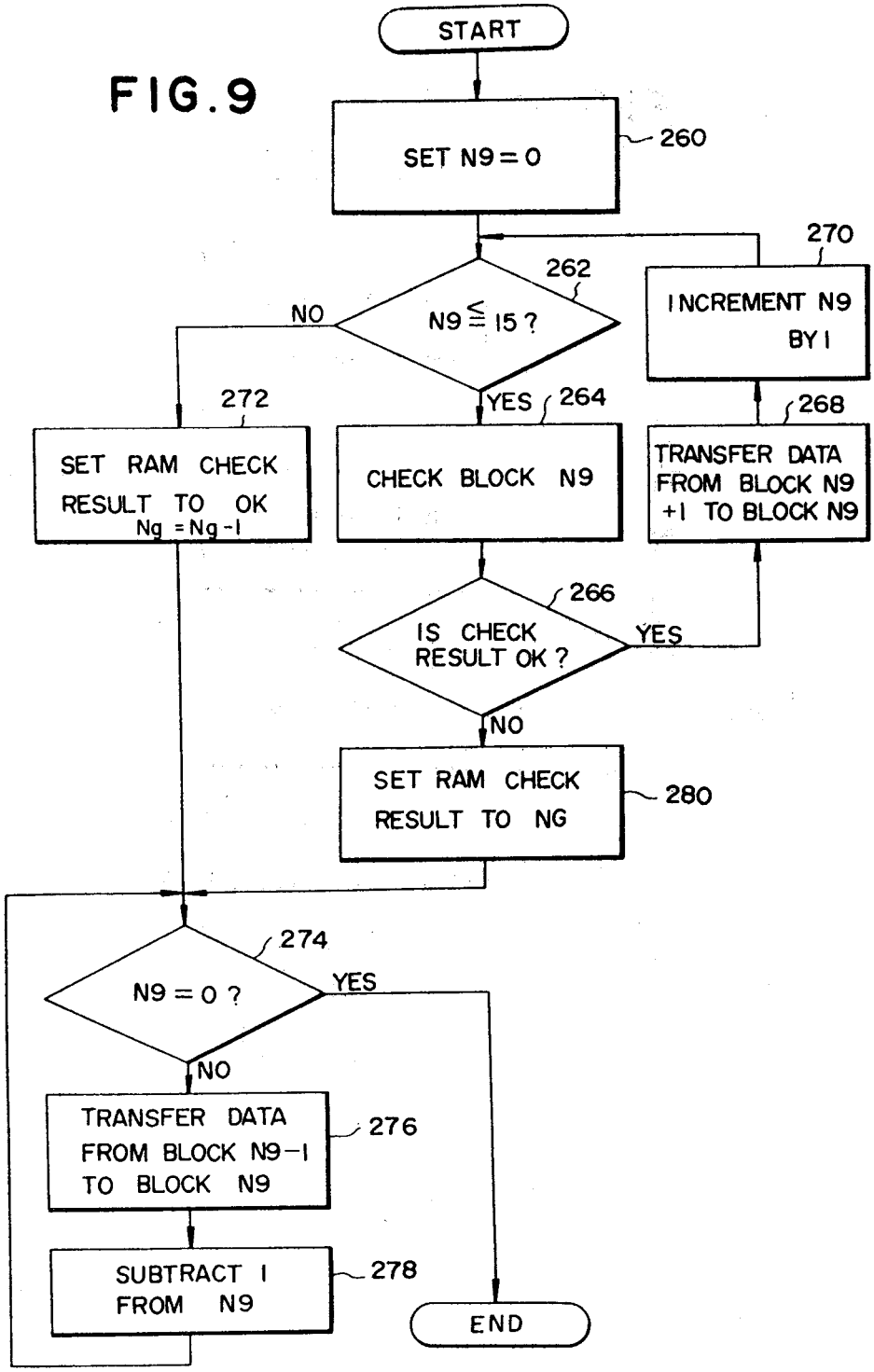
FIG. 9 is a flowchart of another modification of the RAM checking program of FIG. 7.

Now, we refer to FIGS. 7 to 9, there are illustrated and disclosed operation for checking the RAM. In advance to entering into explanation of the preferred embodiment of the present invention for checking the RAM, although it may be well-known to those skilled in the art, hereinbelow is illustrated the general function of the RAM. The most important function of a RAM is to write in and read out a particular value. Therefore a good method of performing a basic check on a RAM is to write in and store a particular data value, then read out the data and check whether the value read out is the same as the value written in. This method will be [explain] *explained* more concretely using FIG. 8. FIG. 8 is drawn in terms of a microcomputer system (such as the Motorola MC6802) which uses a $8\times128$ bit RAM, with [address] *addresses* from 0 to 127, but the same process can be carried out with minor modifications for different numbers of bits, numbers of bytes, and addresses. FIG. 8 is a flow chart of a program to check the RAM.

In the RAM check program, first in block 202 the data value $N_2$ representing the RAM address is set to 0. Next, in block 204 a particular data value $D_4$ is written into the address $N_2$ (=0). Next in block 206, the data $D_5$ is read out from address $N_2$ so as to be compared with the input data $D_4$ to decide whether both of the data values $D_5$ and $D_4$ match at step 208. When the data values $D_5$, and $D_4$ match, the address data $N_2$ is compared with the last address number (=127) of the RAM at a step 210. When the result of comparing the address data $N_2$ and the last address number (=127) determines that the address data $N_2$ is smaller than 127, the checking program goes back to the process step 204. At this time, the address data $N_2$ is incremented by 1 in the process step 212 to address $N_2+1$ to read out the stored data $D_5$ from the address $N_2+1$ (=1) of the RAM at the process step 204. The stored data $D_5$ read from the address $N_2+1$ is compared with the input data $D_4$, and it is decided whether it matches with the latter. As mentioned above, the checking program runs repeatedly until [the result of comparing] the address data $N_2$ and the last address number 127 *are* equal; namely, in the above example, the program is repeated one hundred twenty-eight times and until the value of the address data is 127. When address data $N_2$ is equal to the last address number 127, an "OK" signal is generated in a process step 214 and is outputted through the output unit. If some of the stored data $D_5$ is different from the corresponding input data $D_4$, a decision that the RAM operates incorrectly is made. At this time, an "NG" signal is generated in a process step 216 and is outputted[:].

As mentioned hereinabove, the RAM can be checked whether it operates correctly by use of the checking means of a preferred embodiment of the invention, in which the above described checking program is stored in specific addresses of the $ROM_2$ 32 of FIG. 1. It should be understood that, at the start of checking and before running the checking program, the program will be read out from the $ROM_2$ 32. Further, it must be noted that, in the above-mentioned example the address data $N_2$ is cleared or reset to 0 at starting in the step 202. If the data values to be checked are stored in different addresses; for example, the data values are stored in the RAM at the addresses from 15 to 120, the first address number is written as the address data $N_2$ in the step 202 after clearing the data $N_2$ previously contained therein. If there are additional values stored in different, and perhaps a large number of groups of addresses, checking can be performed by repeating the above-mentioned program with respect to the first address of each group.

While it is possible for checking of the RAM to run the above-explained checking program to check data for all the combinations expected, since all the data values to be inputted and stored are binary numbers composed of only 1's or 0's, it will be sufficient for checking the RAM to check whether each bit of the RAM can be written 1 and 0 and be read out exactly as written. Therefore in practice, the checking program will be run to check the RAM with respect to a first and second data value. The second value data may be the complement of the first data value. Since both data value are combinations of 1's and 0's, checking with respect to the first and second data values can cover all the possible combinations of the data and therefor is sufficient for checking, the RAM. By this way of checking duration of running the checking program can be considerably shortened, and the storage are required for storing the checking program can be reduced to thereby lessen the capacity of the $ROM_2$ 32.

There are various ways in which error can occur in the input circuit, but the more common of these include the following cases: a short circuit between adjacent leads, a break in a lead, or a particular bit in a register staying at 0 or 1. In the short circuit case, adjacent bits in a register have the same values all the time (so-called horizontal short circuit). In the two latter cases, the value of a particular bit in a register never changes.

To detect the fault caused by the abovementioned horizontal short circuit case, data may be loaded into a register in a pattern of repeated binary 01's or 10's, so that adjacent bits do not have the same value. Upon read-out, if two adjacent bits have the same value, a short circuit is indicated.

Next, a method of checking for the other cases, is to first check with one set of data, and then to recheck with new data in which every bit is reversed, from 0 to 1 and vice versa, from the first set of data, checking that the operation is correct with both sets of data.

To carry out these two tests at the same time, a first check may be made with an input in which the first standard data is 01010101, and a second check in an input state in which the second standard data is 10101010.

When the number of input signals is high, if the data (D2) showing the address of the input and the standard data (D3) are separate for each of the input signals, the amount of data involved is very large, and the program size is increased. In cases like this, if the input signal data addresses are arranged to be consecutive, the first and last addresses of the data can be stored, and the check can be made by incrementing the address progressively through the data to the last address. If this is done the amount of data (D2) indicating addresses is decreased, and the ROM for the check program can advantageously be made smaller. Further, if the standard data uses the two patterns described above (viz. 01010101 and 10101010) there is not only the above described benefit of using these patterns, but also the ROM may advantageously be made smaller. In cases where 1 byte data items and 2 or 3 byte data items are mixed, the size of the ROM may be decreased by, instead of attaching to each data item a data determining the number of bytes in that particular data item, collecting together consecutively all data item with the same number of bytes and determining the number of bytes per items from the first and last address of the data.

When register addresses are made consecutive, and when the registers are physically adjacent, there is the possibility of a short circuit between registers. In this case the same bits in adjacent registers may be short circuited (so-called vertical short circuit), or adjacent bits in adjacent registers may be short circuited (so-called diagonal short circuit). These types of short circuit will happen only very rarely, but in cases where an extremely high level of reliability is required, it will be desirable to add procedures to check for them. In practice this will be done as follows.

First check the first address supposing that the address is even) with the first data value 00000000. (Choose an input state such that the input data naturally takes such a value.) Check the next address (an odd address) with the second data value 11111111. From there on, alternate the first and second data values in even and odd addresses. When this is done, in the vertical direction (i.e. between registers) the data bits will be aligned in a pattern of alternating 0's and 1's, and a vertical short circuit can be determined. Furthermore, in the diagonal direction the bits also alternate between 0 and 1, so that diagonal short circuits can also be detected.

If it is desired to check for a horizontal short at the same time as a vertical short, this can be done by checking using a first data value 01010101 in even addresses and a second data value 10101010 in odd addresses alternately.If this is done 0's and 1's alternate in both horizontal and vertical directions so that short circuits can be detected.

In case where the addresses of the input circuit registers are not consecutive or data items with the same number of bytes are not or cannot be arranged consecutively, then the input data may be organized in the manner described above, rearrranged, and stored in a RAM; the data can then be checked in the RAM. In this case it will also form a partial check of the RAM.

In the meanwhile, as another function of the RAM, it will be also essential to keep data written therein for a long period exactly as is. Therefore, when the RAM is checked, it is preferable to provide a sufficient time lag between writing data and reading out the same. Therefore, upon running or executing the checking program, the time lag may be provided between the steps 204 and 206. This can be performed by a delaying process step interposed between the steps 204 and 206. However, this may expand the duration of running the program and waste time; therefore, preferably the program will be arranged to contain a job in step 204 such as writing all of the required input data in sequence and then moving to step 206. By this, for the first data written in the RAM at first, there can be provided a time lag. If the time lag thus provided is insufficient, the abovementioned step can be interposed between the steps 204 and 206. In this case, the time lag to be provided by the step as a job is shorter than that required in the above example and will comparably decrease wasting of time.

Referring to FIG. 8, there is illustrated a flowchart which shows in detail the execution of the checking program in use with the checking means in accordance with the preferred embodiment of the invention. It should be noted that hereinafter described in an execution of the checking program in use with the Motorola Model No. MC 6802. However, the specific microcomputer system is used as an example for making a detailed description of the preferred embodiment of the present invention, and it should not considered limitative thereof. The present invention is applicable to all other microcomputer systems which can operate as sought in the invention. In the Motorola Model No. MC 6802, there is provided eight bits of RAM at addresses 0 to 127. Further, at addresses 1200 to 1203 there are respectively stored reference data values 01010101, 10101010, 00000000 and 11111111.

The checking program is started from START. At first, in process step 220, data $N_3$ counting the running phase of the program is cleared or reset to 0. The data $N_3$ is stored in an index-register (B-register) of the CPU, for example. In process step 222, an address data $N_4$ is cleared or reset to 0. The address data $N_4$ may be also stored in an index-register of the CPU, for example. In process step 224, reference data $D_6$ stored in address $1200 \times N_3$ (=1200) is read out and is written in address $N_4$ (=0). On a process step 226, the address data is incremented by 1. In process step 228, complement data $D_7$ of the reference data $D_6$ is written in address $N_4$. In step 230, the address data $N_4$ is compared with the last address number (=127). If the value of the address data is smaller than that of the last address data, then the program will go back to step 224. At this time, the address data $N_4$ is incremented by 1 in process step 232. In other words, since the reference data $D_6$ stored in the address $1200+N_3$ (=0)(=1200) is 01010101, the complement data $D_7$ is 10101010. As will be apparent from the flowchart of FIG. 9, since the beginning address is 0 and the address $N_4$ is gradually increased in steps 226 and 232, the value $N_4$ in the step 224 is even and that on the step 228 is odd. Therefore, by this series of execution of the program in the addresses 0 to 127 of the RAM, the reference data $D_6$ (=01010101) is stored in each even address and the complement data $D_7$ (=10101010) of the reference data $D_6$ is stored in each odd address. When the address data $N_4$ reaches 127 and is equal to the last address number, the program goes to the next process step 234. At step 234, the address data, which is 127, is cleared and reset to 0, again. In step 236, the stored data $D_8$ (=01010101) stored in the address $N_4$ and the reference data $D_6$ (=01010101) are read out and compared together. If the data $D_8$ is different from the data $D_6$, a jump instruction to executed process step 238 is generated in step 236. In step 238, the NG signal is generated and forwarded to be outputted. When the data values $D_8$ and $D_6$ are matched in step 236, the program proceeds to next process step 240. In step 240, the address data $N_4$ is incremented by 1. In step 242, the stored data $D_8$ (=10101010) stored in the address $N_4+1$ and the reference data $D_7$(=10101010) are read out and compared together. If the data $D_8$ is different from the data $D_7$, a jump instruction to jump the program to the process step 238 is generated. In step 238, NG signal to be outputted is generated. When the data values $D_8$ and $D_7$ match, the program goes to step 244. In step 244, the address data $N_4$ is compared with the last address number (=127). When the value of data $N_4$ is less than 127, the program goes back to step 236. At this time, the address number $N_4$ is incremented 1 on a process step 246. Execution of the program in the series of steps 236 to 244 is repeated until the address number reaches 127. When the address data $N_4$ is 127, in step 244 the value of address data $N_4$ matches or exceeds the last address number (=127), and the program goes to step 248. In step 248, the phase count data $N_3$ is read out from the B-register of the RAM and is compared with the last phase count number (=3). When $N_3$ is less than 3, the program goes back to step 222. At this time, the data $N_3$ is incremented by 1 on the process step 250. Then, the checking program is run or executed to check the function of the RAM with respect to the reference data 10101010 stored in the address 1201 and the complement data thereof. In the same manner, the checking program is further run and executed with respect to the reference data 00000000 and 11111111 respectively stored in the addresses 1202 and 1203 and the complement data thereof.

When the phase count data $N_3$ reaches 3 and matches the last phase count number (=3) in step 248, the checking program goes to process step 252 in which an OK signal is generated and forwarded to be outputted. Then, the checking program for checking the function of the RAM reaches the final step END. During running or executing the above-mentioned checking program, writing and reading data, performing the complement operation and the comparing operation is carried out by the A-register of the CPU, for example. The following Table II shows data written in addresses 0 to 9 of the RAM during each phase.

TABLE II

| address phase | $N_3 = 0$ | $N_3 = 1$ | $N_3 = 2$ | $N_3 = 3$ |
|---|---|---|---|---|
| 0 | 01010101 | 10101010 | 00000000 | 11111111 |
| 1 | 10101010 | 01010101 | 11111111 | 00000000 |
| 2 | 01010101 | 10101010 | 00000000 | 11111111 |
| 3 | 10101010 | 01010101 | 11111111 | 00000000 |
| 4 | 01010101 | 10101010 | 00000000 | 11111111 |
| 5 | 10101010 | 01010101 | 11111111 | 00000000 |
| 6 | 01010101 | 10101010 | 00000000 | 11111111 |
| 7 | 10101010 | 01010101 | 11111111 | 00000000 |

TABLE II-continued

| address phase | $N_3 = 0$ | $N_3 = 1$ | $N_3 = 2$ | $N_3 = 3$ |
|---|---|---|---|---|
| 8 | 01010101 | 10101010 | 00000000 | 11111111 |
| 9 | 10101010 | 01010101 | 11111111 | 00000000 |

As will be understood from the above Table II, during the first and second phases; i.e. during the phases in which the phase count, $N_3$ is 0 or 1, all the bits of the RAM can be checked as to whether each bit can be written with input data and read out without change;

during the third and fourth phases; i.e. during the phases in which the phase count is 2 or 3, all the bits of the RAM can be checked as to whether each bit can be written with input data and read out without change;

during phase 0, shorting between the same bits in adjacent addresses and adjacent bits in the same address can be checked;

during phase 1, shorting between the same bits in adjacent addresses and adjacent bits in the same address can be checked;

during phase 2, shorting between one bit in an address and adjacent bits to the left and right in adjacent addresses can be checked; and during phase 3, the same checking operation can be made as in phase 2. By this, it will be appreciated that the checking program need not be executed for all the phases. Namely, for checking all the function of the RAM, it may be sufficient to execute the program for phases 0, 1 and 2, for example, it should be further appreciated that the above-explained flowchart in FIG. 8 can be applied to check the input unit without changing the chart except for the steps 222 to 232. If the flowchart of FIG. 8 is applied to check the input unit, the steps 222 to 232 will be omitted from the chart.

As mentioned above, the checking program as shown in FIG. 9 can perform checking of the functions of the RAM. However, in this way, the data previously stored in the RAM to be checked will necessarily be cleared or rewritten during execution of the checking program. In order to execute the control program, all of the data, some of which was previously stored and cleared during running of the checking program, should be re-written into the RAM after finishing the checking operation. This causes a waste of time due to writing of the data. If the data stored in the RAM is a history, for example, which can not be restored, it will be impossible to run or execute the checking program without losing some data. Therefore, it is recommendable that the necessary data is restored in other storage means such as, for example, in a temporary memory. However, if the control system is provided with the temporary memory, the RAM memory must be provided with a capacity twice that required for carrying out control operations. Otherwise, for restoring the necessary and important data in the RAM, there will be required another RAM connected to the former. For eliminating such a difficulty and drawback in the former flowchart, there is shown another flowchart of checking a program which can solve the above-mentioned problems, in FIG. 8. In the flowchart shown in FIG. 9, the addresses of the RAM 0 to 127 are divided into sixteen blocks, i.e. block Nos. 0 to 15. Each block is checked in sequence after finishing the check of the previous block. Upon executing the checking program for one of the blocks, data stored in the block is transferred and stored in the previous block to maintain the storage.

As shown in FIG. 9, immediately after START of executing the checking program, an address data $N_9$ is cleared and reset to 0 in process step 260. It should be noted that, in this chart, the address data $N_9$ indicates not individual addresses but the blocks of addresses previously divided. In step 262, the address data $N_9$ is compared with the last block number 15. When the value of the address data $N_9$ is smaller than 15, the program proceeds to process step 264. In steps 264 and 266, the data stored in each address is read out and checked in order by way of comparing the data with the reference data. The manner of checking in step 264 is substantially the same as illustrated in FIGS. 7 and 8. When the data stored and read out from each address of the block is matched with the corresponding reference data, the step of the checking program goes to a process step 268. In step 268, the data stored in the next block $N_9+1$ is transferred and stored in the block $N_9$. Thereafter, the address data $N_9$ is incremented by 1 in process step 270. Then, the program goes back to step 262. The series of steps 262 to 260 are repeatedly carried out until the address data reaches 16. When the address data $N_9$ is 16 in step 262, the value of the address data $N_9$ exceeds the last block number 15, and the program step goes to process step 272. In step 272, an OK signal is generated and transmitted to be outputted, and $N_9$ is decremented by one. Then, in step 274, the address data $N_9$ is compared with the first block number 0. When the address data $N_9$ is larger than 0, the program goes to process step 276. In step 276, the data stored in the block $N_9-1$ is transferred and stored in the block $N_9$. Thereafter, the address data $N_9$ is decremented by 1 on a process step 278. Then, the step goes back to the step 274. The series of steps 274 to 278 will be repeated until the address data $N_9$ and the first block number 0 match. If the result of checking in step 264 determines an error in step 266, the program goes to a process step 280. In step 280, an NG signal is generated and transmitted to be outputted. Thereafter, in step 274, the address data $N_9$ is compared with the first block number 0. When the address data $N_9$ is larger than 0, the program step goes to a process step 276. In step 276, the data stored in the block $N_9-1$ is transferred and stored in the block $N_9$. Thereafter, the address data $N_9$ is decreased by 1 in process step 278. Then, the program goes back to the step 274. The series of steps 274 to 278 will be repeated until the address data $N_9$ and the first block number 0 match. Thereby, the functions of all the addresses of the RAM can be checked, and the previously stored data may be maintained except the data in the block 0. Thus, only unimportant data should be stored in block 0.

Figure 10:
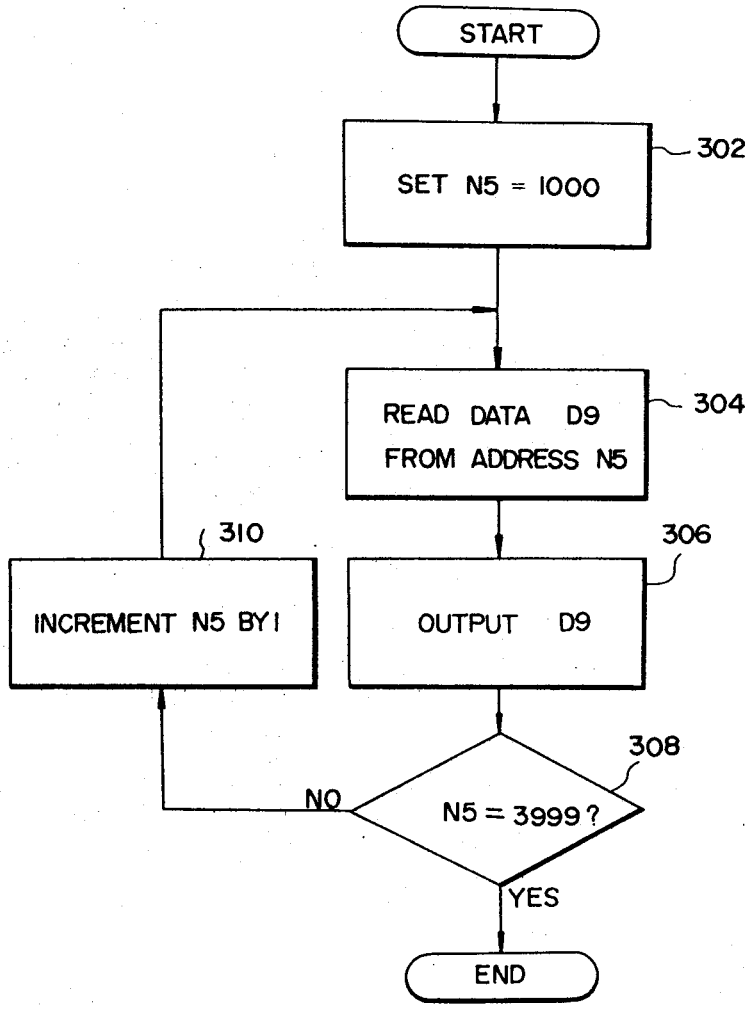
FIG. 10 is a flowchart of one example of a ROM checking program in use with the checking means according to the present invention.

Now referring to FIG. 10, there is shown a flowchart of a checking program for checking functions of the ROM. Since the function of the ROM is to store programs to be run in the CPU and data for running the program in the form of a binary code or decimal representation, the checking is carried out by reading out the data stored in the ROM and comparing the data read with the data which should be stored in the addresses. Therefore, the checking may be performed, in practice, by comparing the data read with the reference data. The control program and the data thereof will be stored in the $ROM_1$ 31 of FIG. 1, and the checking program and the reference data will be stored in the $ROM_2$ 32 of FIG. 1. For performing checking of the function of the ROM, the stored data in each address of the $ROM_1$ 31 is read out in order and compared with corresponding reference data stored in corresponding addresses of the $ROM_2$ 32. When $ROM_1$ 31 is functioning correctly, the data read therefrom should match with the corresponding reference data. By the above method of checking, the function of the $ROM_1$ 31 can be checked. However, in such a process, $ROM_2$ 32 is required to have at least the same capacity as the $ROM_1$ 31. If the $ROM_2$ 32 is contained in the control system as a component, it necessarily increases the size of the ROM 30 of FIG. 1 comprising $ROM_1$ 31 and the $ROM_2$ 32. This may also cause an increase of the cost of the system. For avoiding such a drawback, it is preferable to perform checking the function of the ROM in use with a ROM and arithmetic unit provided outside the system. It will be appreciated that, if necessary, the CPU in the system can be used as an arithmetic unit for performing the checking operation. However, there is disclosed hereinafter an example of the use of a ROM and arithmetic unit provided outside the system. In this case, the data stored in the ROM of the system is read out therefrom and outputted to the arithmetic unit. At the same time, corresponding reference data is read from the ROM outside the system. The arithmetic unit operates to compare the data to see if they match. By this, only a program for reading out the stored data from the ROM of the system and outputting the same is required in the control system for checking the function of the ROM therein. Thereby, the control system can be reduced in size and cost. FIG. 10 is a flowchart of a program for reading and outputting the data stored in the ROM of the system. It should be noted that hereinafter disclosed is an example of a case in which the data is stored in addresses 1000 to 3999" of the ROM. Immediately after the START of the program, an address data $N_5$ which is generally stored in an index-register of the CPU, is set to 1000 in process step 302.

In the next process step 304, data $D_9$ stored in the address $N_5$ (=1000) of the ROM is read out. The data $D_9$ read is outputted through the output unit of the system, which method of output will be illustrated later, in a process step 306. Then, the address data is compared with the last address number (=3999) in a step 308. When the value of the address data $N_5$ is less than the last address, control goes to process step 310. In step 310, the address data $N_5$ is incremented by 1. Then control returns to process step 304 wherein the data $D_9$ stored in the address $N_5+1$ of the ROM is read out. By repeating the above-mentioned series of steps 304 to 310, the function of all the addresses 1000 to 3999 of the ROM can be checked in order. When the address data $N_5$ reaches 3999 which matches with the last address number, the step 308 makes a decision that the checking program has run fully and finishes the job. The data read out and outputted is checked by comparing with the reference data corresponding thereto which is stored in the ROM provided outside the control system. It will be understood that the checking program is run in the arithmetic unit to which the data read from the ROM of the system and the reference data read from the ROM for checking are transferred and in which the comparison operation is carried out with respect to both data.

Now we explain a method for outputting the data from the control system. For outputting the data, there are provided a plurality of output terminals, the number of terminals corresponding to the number of data. It will be preferable that, since the outputting of the data is made by way of time sharing, the clock-pulse normally applied to the control system is outputted to the arithmetic unit for controlling the later in synchronism with the control system. This may result in eliminating the time lag between the operations of the control system and the arithmetic unit. This is also advantageous in making the checking operation accurate. Although the above-mentioned output system is preferable from the point of view of accuracy of checking result, it has the disadvantage that it requires a large number of output terminals in the control system. For avoiding and eliminating such a drawback or disadvantage, it will be practical to modulate the form of output data by pulse code modulation and to perform a parallel-serial conversion on the output data. By this, an output signal consisting of several bits, for example eight bits, of data can be outputted by one output line. Thereby, the number of output terminals provided on the control system can be considerably reduced. Further, by reducing the output terminals, it will be possible to increase durability of checking.

Hereafter disclosed is an example actually applicable to the control system of the present invention. In this example, for converting the parallel data to the serial data, there is employed a parallel-serial convertor, such as, for example, Motorola Model No. 6850 or Motorola Model No. 6852. The output data from the CPU is inputted and written in the parallel-serial convertor and is converted into a serial pulse code train. It is apparent that, in recent years, there have been developed microcomputer systems incorporating such parallel-serial converters, and if such a microcomputer is used, a further converter is unnecessary.

Figure 11:
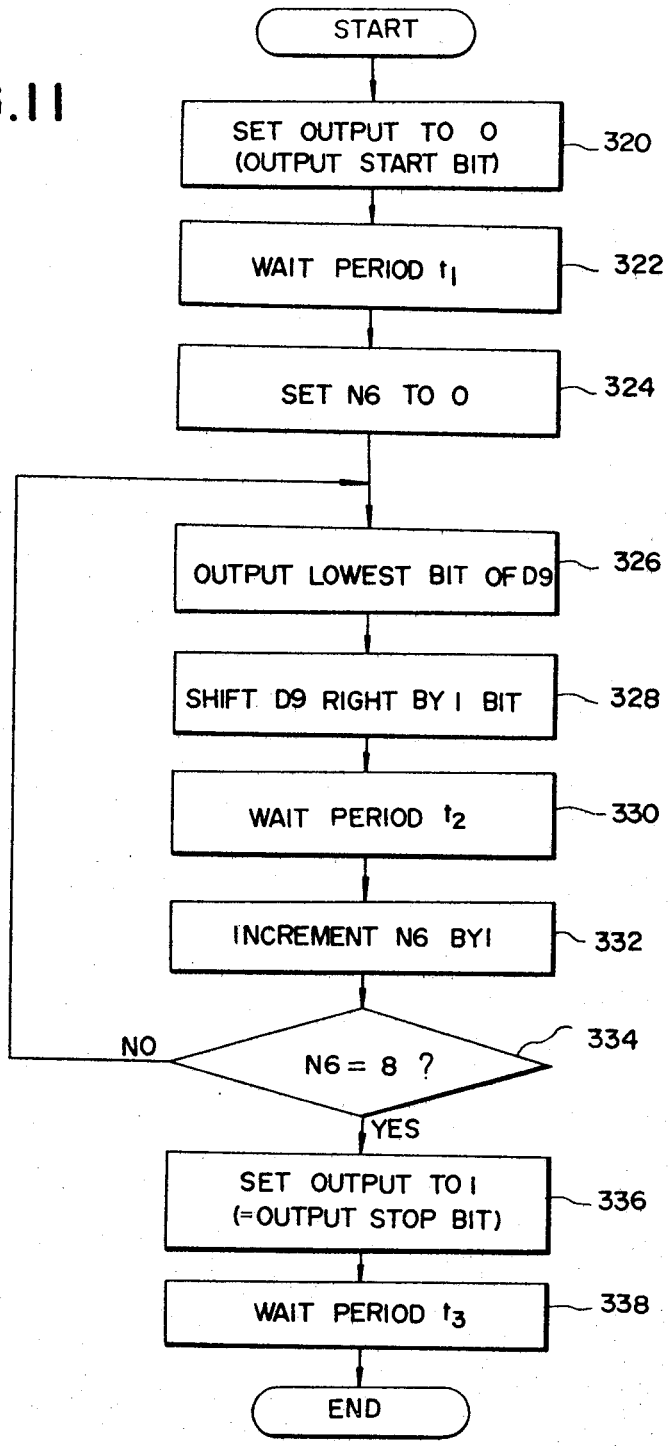
FIG. 11 is a flowchart of one example of a program for converting output to pulse-code train.

Although the above-mentioned output method can simplify the construction of the output circuit, it may increase the cost thereof. In view of the cost, it will be preferable to convert the parallel code data to serial code data without using a parallel-serial convertor. FIG. 11 shows a way of converting the output data from the CPU into a parallel code or pulse code train,. It should be noted that in FIG. 11 there is shown a process step corresponding to the process step 306 of FIG. 10 and in this step eight bits of data are converted from parallel code to serial code. After the START of the program, first the output is cleared to the value 0 in step 320. It should be noted that, in this program, a start-bit signal and stop-bit signal are generated and outputted to the arithmetic unit so as to start and stop execution of the program. The start-bit signal is generated by clearing the output from the value 1 to 0 and the stop-bit signal is generated by setting the output value to 1. Thus, when the output value is cleared from the value 1 to 0 and the arithmetic unit detects the start-bit signal, the program is started. After starting the arithmetic unit, the execution of the program is delayed in process step 322 by a period $t_1$ in order to adjust the interval for modulating the output data to a constant. This delay will be carried out by repeatedly executing NO OPERATION instructions or executing a looping program, which may have no meaning, for the required period. Thereafter, in process step 324, phase count $N_6$ is cleared to 0. In process step 326, the least significant bit of data $D_9$ is outputted to the arithmetic unit. In process step 328, the contents of $D_9$ are shifted one bit to the right, so that the bit above the least significant bit becomes the next bit to be outputted. After the operation of the step 328, a delay time $t_2$ is provided by process step 330. The method for providing the delay time $t_2$ is substantially the same as that explained with respect to step 322. After expiration of the delay time $t_2$, the phase count $N_6$ is incremented by 1 in process step 332. Then data $N_6$ is compared with 8 in step 334. When the value of $N_6$ is less than 8, the program goes back to step 326 to repeatedly execute the series of steps 326 to 334. The series of operation may be repeated until the value of the phase count $N_6$ reaches or exceeds the value 8 in step 334. Actually, in the above disclosed example, the series of operation is repeated eight times. When a decision that the data $N_6$ is equal to or more than 8, control goes to process step 336 in which the stop bit signal is outputted to the arithmetic unit. After expiration of a delay time $t_3$ provided by a process step 338, the program reaches END. The delay time $t_3$ is provided for the purpose of waiting for the arithmetic unit to finish the checking operation. Therefore, if the checking operation by the arithmetic unit can be finished in a substantially short period, step 338 is unnecessary and can be omitted.

It should be noted that, although in the specific flowchart the program for converting the parallel code to the serial code is disclosed hereabove, it can be embodied otherwise; for example, the decision step 334 can be arranged between the process steps 326 and 328. In this case, the phase count $N_6$ is compared with the value 7.

Figure 12:
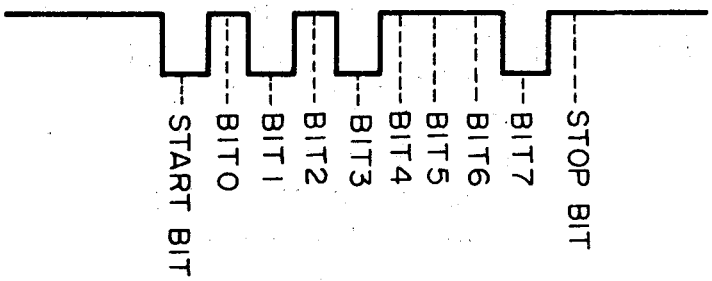
FIG. 12 shows a waveform of an output signal generated by the program of FIG. 11.

As a result of the above-explained parallel-serial conversion, a serial code, as shown in FIG. 12 as an example, can be outputted. In FIG. 12, is shown a waveform of the output signal having a value 01110101.

As the addresses of the ROM to be checked by the foregoing checking program may be previously decided before executing the program and as the data stored in each address is outputted in sequence, the address from which the data is outputted can be determined by counting the start bits outputted to the arithmetic unit. However, it will be preferable to output the address data $N_5$ together with the stored data $D_9$. In practice, the address data $N_5$ and the stored data $D_9$ will be outputted alternately. This may provide advantages and convenience for detecting the addres from which the stored data $D_9$ is outputted. Further, the counting element for counting the start bit from the arithmetic unit may be omitted so as to simplify the unit and to increase the durability thereof.

It should be clearly understood, that the above mentioned method for converting the parallel code to serial code can be applied to an output element for outputting the result of checking with respect to other units or elements for example, the input unit, or RAM.

Figure 13:
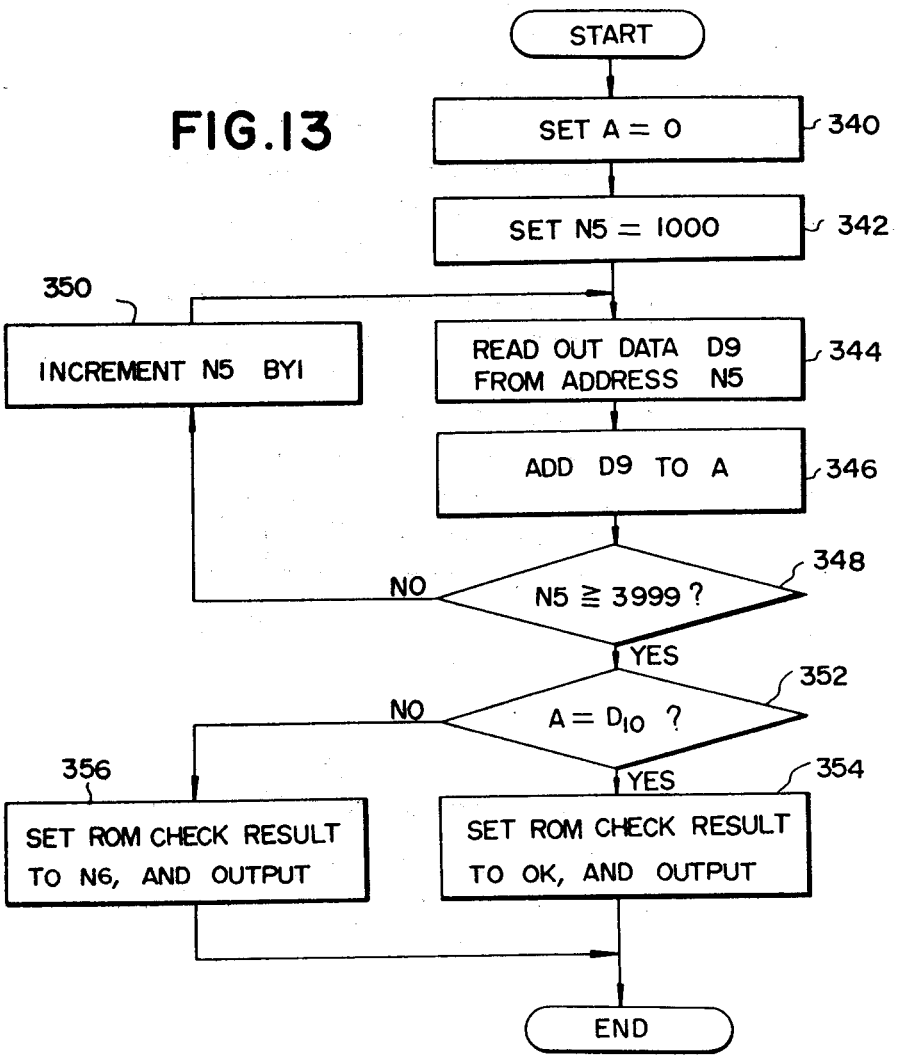
FIG. 13 is a flowchart of a modification of the ROM checking program of FIG. 10.

Although the hereabove disclosed method can check the function of the ROM with respect to all the data stored therein, and further is advantageous to detect what data is in error, it takes a substantially long time to run the checking program both in the control system outputting all the data stored in the ROM and in the arithmetic unit carrying out the checking operation. For avoiding such drawback and disadvantages in the foregoing example, there is provided another method for checking the function of the ROM in use with the checking means in accordance with the preferred embodiment of the present invention. The other method will be disclosed hereinafter with reference to FIGS. 13 and 14. It should be noted that, for performing the hereafter explained checking method, there are two ways, one of which is calculating the sum of the value of all the data by an arithmetic operation and the other way is calculating the logical sum of the data by a logical operation. First, there is disclosed a method for checking the function of the ROM by way of calculating the arithmetic sum. FIG. 13 shows a flowchart of a program for checking the function of the ROM by calculating the arithmetic sum of all the data stored in the ROM. Immediately after the START of the program, a register A, which maybe an A-register of the CPU and in which the arithmetic sum of the data is to be stored, is cleared to 0 in process step 340. Thereafter, in process step 342, an address data $N_5$ is set to the value of the first address of the ROM. In this example, the ROM has addresses 1000 to 3999. Therefore, the address data $N_5$ is first set to 1000. In process step 344, the data $D_9$ stored in the address $N_5$ (=1000) is read out. The read data $N_5$ is added to the value in the register A in process step 346. Thereafter, in decision step 348, the address data $N_5$ (=1000) is compared with the final address number (=3999). When the value of the address data $N_5$ is less than 3999, the program goes back to process step 344. At this time, the address data $N_5$ is incremented by 1 in process step 350. Thereby, in a next series of steps 344 to 348, the data stored in address $N_5+1$ (=1000) is added to the register A. The series of steps 344 to 348 is repeated until the address data $N_5$ reaches 3999. Therefore, in this example, the series of steps 344 to 348 is repeated four thousand times. When the step 348 decides that the address data $N_5$ has reached 3999, then the program goes to a decision step 352. In step 352, the data stored in the register A, which is the arithmetic sum of all the data values $D_9$, is read out and compared with a reference data values $D_{10}$. If the data values match, an OK signal is generated and outputted in process step 354. If the data values are different, an NG signal is generated and outputted in process step 356. It should be appreciated as a matter of course that the value of the reference data $D_{10}$ will be previously preset to the arithmetic sum of the data values $D_9$. It is natural that when a large number of data values are added, the number of digits in the arithmetic sum will be high. Of course it is possible to check the function of the ROM by comparing all digits of the sum with the reference data $D_{10}$. In this case, the reference data $D_{10}$ must have the same number of digits as the sum. However, it will be preferable to check the sum with reference to the reference data $D_{10}$ by comparing only some of the least significant digits with the corresponding digits of the reference data. For example, if eight bit of data values are added and if one or more values are in error, the difference between the sum and the reference data will become apparent by comparing the least significant bits of each byte. Therefore, the checking of the ROM cam be performed by comparing the least significant bits of the sum and the reference data $D_{10}$. In the practical manner, when each data is added to the register A and when a column carry is made, the carried column can be omitted and merely the least significant bits of data must be stored in the register A. It will further be preferable to arrange the data to be added ito the arithmetic sum so that the value of the least significant bits of data, if there is no error is a predetermined value, for example, 00000000 or 01010101. This will also make it possible to check shorting between adjacent bits of register A.

Figure 14:
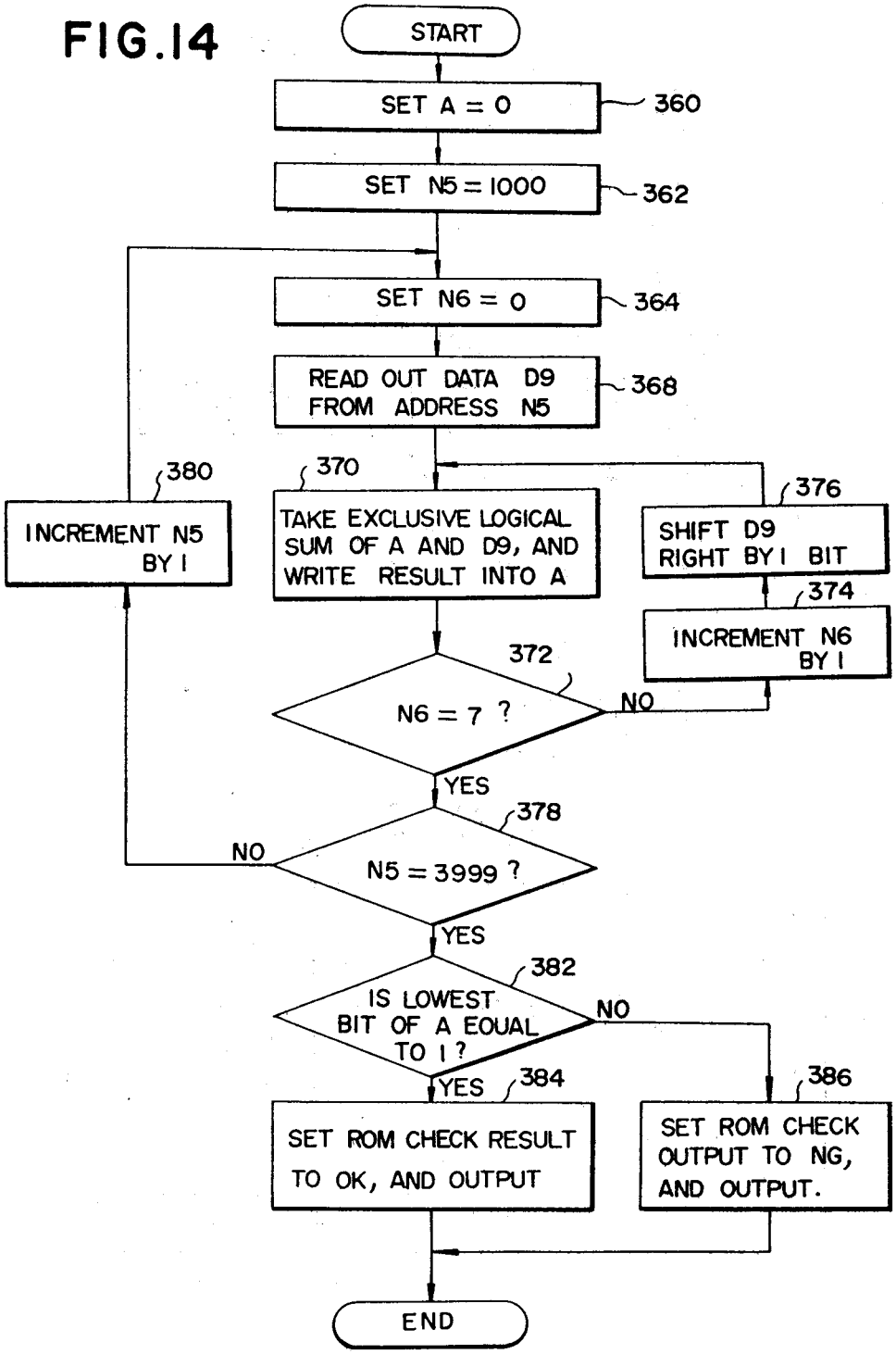
FIG. 14 is a flowchart of another modification of the ROM checking program of FIG. 10.

Now we explain another method of checking the ROM by use of a sum of the data stored in the ROM, in which the exclusive logical sum is compared with the corresponding reference data $D_{10}$. In practice, the exclusive logical sum can be calculated by an exclusive logical sum operation in process step 346 of FIG. 13 in which the data $D_9$ stored in the address $N_5$ is added to the register A. This means, in other words, checking the parity of the data. Of course the parity of the reference data should correspond to the parity of the data values. Further, if desired, a data value to adjust the parity may be used merely for the purpose of checking so that the exclusive logical sum is a predetermined value. It will be also possible to check the function of the ROM by checking the exclusive logical sum of all the data $D_9$ with reference to the reference data $D_{10}$. This means a parity check being made with respect to the sum of data $D_9$. FIG. 14 shows a flowchart for running the checking program. Immediate after START, in process step 360, register A is reset to 0. Then, in process step 362, the address data $N_5$ is set to the first address (=1000) to be checked. It should be noted also in this example, that the data stored in addresses 1000 to 3999 is checked. In process step 364, a count $N_6$ with respect to each data $D_9$, is reset to 0. In process step 368, data $D_9$ stored in address $N_5$ of the ROM is read out. First, in step 370, the exclusive logical sum of the data $D_9$ and register A is formed, and stored back in register A. Thus the exclusive logical sum of the $2^0$ bit of register A and the $2^0$ bit of the data $D_9$ is stored in register A. Next, in decision step 372, the count $N_6$ is compared with the number of the most significant bit (=7) to check whether the all bits of data $D_9$ have been operated on in the exclusive logical sum with the $2^0$ bit of the register A. When the value of the count $N_6$ is less than 7, the program goes back to step 370. At this time, in process step 374, the count $N_6$ is incremented by 1 and in a process step 376, the data $D_9$ is shifted one bit to the right. The series of steps 370 to 376 is repeated until the count $N_6$ reaches 7. Namely the series of steps 370 to 376 is repeated eight times. Thus all bits of the data $D_9$ from $2^0$ to $2^7$ are operated on to calculate the exclusive logical sum with the least significant bit $2^0$ of the register A. When a decision that the count $N_0$ is equal to or more than 7 is made, the program goes to a decision step 378. In step 378, the address data $N_5$ (=1000) is compared with the last address number (=3999) to check whether the data of all the addresses of the ROM has been operated on. When the value of the address data $N_5$ is less than 3999, the program goes back to step 364. At this time, in process step 380, the address data $N_5$ is incremented by 1. Next, the series of program steps 370 to 374 is executed with respect to the data $D_9$ of the address $N_5+1$ (=1001). The series of steps 364 to 380 including the series of steps 370 to 376 is repeated until the value of the address data $N_5$ is 3999; i.e. the series of steps 364 to 380 is repeated four thousand times. When the address data $N_5$ reaches 3999 and a decision that the address data $N_5$ is equal to or more than 3999 on the step 378 in made, the program goes to a decision step 382. In step 382, the value of the least significant bit of the register A is checked. In the example shown in FIG. 14, if the function of the ROM is correct, the value will be 1. Therefore, when the value of the least significant bit of the register A is 1, the program goes to a process step 384 to generate and forward to output an OK signal. On the other hand, if the value of the least significant bit of the register is 0, the program goes to a process step 386 to generate and forward to output an NG signal. Thereby, the parity of the data stored in the ROM can be checked.

As another method, a parity chek can be made by calculating eight separate exclusive logical sums in each of which the bit is shifted one bit to the left with respect to the bit of the preceding address; i.e., by calculating an exclusive logical sum of the $2^0$ bit of address 1000, the bit $2^1$ of address 1001 . . . the $2^7$ bit of address 1007, the $2^0$ bit of address 1008 . . . the $2^7$ bit of address 1015 and so on. Next an exclusive logical sum is made of the $2^1$ bit of address 1000 and so on and this is repeated until all the bits of all the data of the ROM are calculated in the exclusive logical sum. Namely, each series of operation such that the $2^0$ bit of address 1000 to the $2^6$ bit of address 3999, containing eight series of calculation, will be made. The results of the operation will be checked either per series or as a total as to whether the value of the least significant bit of register A is matched with the correct parity.

Although the above-mentioned checking method by way of checking parity can make it possible to check the function of the ROM easy, it may cause an error of checking in such a case that an even numbers of data values are incorrect, and thus, occasionally, the least significant bit of the A register may match with the correct value even though there are errors. This type of error will comparably frequently occur in the case of checking a large number of data values. For probabilistically avoiding such an error, one may divide the data into a plurality of blocks in which the exclusive logical sum is individually calculated and the parity checked. For example, in case of checking the parity with respect to data stored in address 1000 to 9999, the data is divided into three blocks, addresses 1000 to 3999, 4000 to 6999 and 7000 to 9999. For each block, the exclusive logical sum is calculated and the parity thereof is checked independently. When the parity of any one of the blocks is different from the correct parity, the NG signal is outputted to indicate that there are one or more data values in error.

Generally, the capacity of a RAM or ROM and the other devices employed for the control system is 2" bits for some integer n. For example, in one case, the capacity of the RAM is $2^{10}$ bits and the capacity of the ROM is $2^{13}$ bits, $2^{14}$ bits or $2^{15}$ bits. Comparing the amounts of the data and the capacity of the RAM or the ROM, it is naturally that the latter is larger than the former.

Therefore, if problems arise in one or more bits which are not used for storing data, it will not affect the control system and can be disregarded. Thus, it is sufficient to check the ROM and RAM within the area where the data for running the control program is stored. However, in considering shorting between bits, it will be preferable also to check the addresses adjacent to addresses storing the control data.

Checking whether the control program is executed can be carried out by checking the output data corresponding to the input data. For checking the output data, there may be used control data, such as, for example, data for table look up. Therefore, in a simple check of the control system, it will be necessary to check only the control data stored in the ROM. This may result in simplification of the checking program and shortening the duration of running of the checking program. Thus, this may provide advantages, but has a risk of error in checking the control system.

Now we explain a method for checking the output unit of the control system. Generally, the function of the output unit in a control system employing a microcomputer system is to write an output data forwarded from the CPU as a result of an operation thereof in an address where an output circuit is provided. Therefore, checking of the function of the output unit should be made with respect to whether the output data from the CPU can be written in the address of the output unit and can be read therefrom as it is. In practice, therefore, checking of the output unit can be performed by checking the inputted data and the output data and by checking whether these data values are identical. For the purpose of checking, data previously arranged for checking the output unit is written in the address of the output unit and is read out therefrom to output to a measuring means provided outside the control system.

Figure 15:
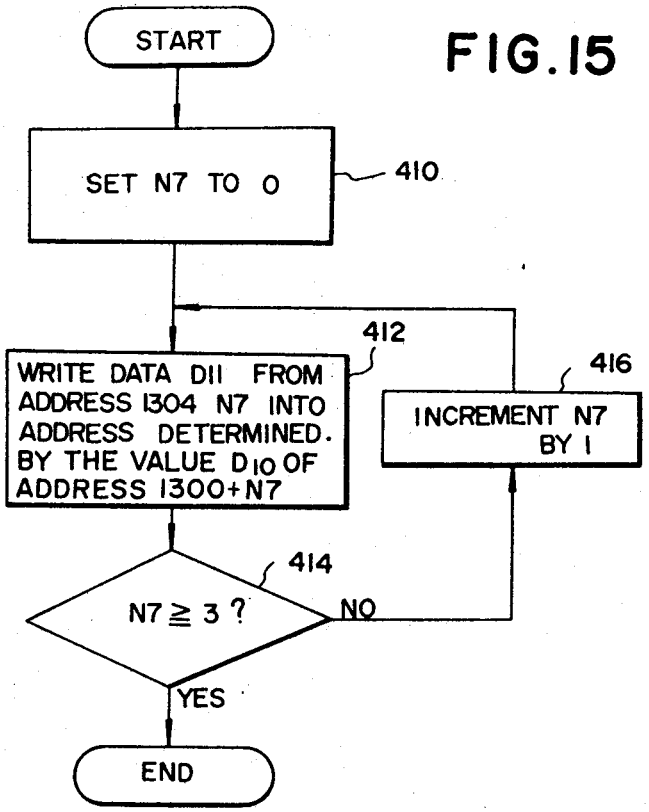
FIG. 15 is a flowchart of one example of an output unit checking program in use with the checking means according to the present invention.

In FIG. 15 is illustrated a flowchart of the checking program for checking the output unit. In FIG. 15, the checking program structure is constructed for checking an output unit having output circuits in addresses 30, 32, 34 and 36.

Immediately after START, a count $N_7$ is reset to 0 in process step 410. In process step 412, data $D_{11}$ stored in an address 1304$+N_7(=1304)$ is read out and rewritten in the address determined by address data $D_{10}$ (=30) stored in address 1300$+N_7(=1300)$. The values of data $D_{11}$ and $D_{10}$ will be found in Table III.

TABLE III

| $N_7$ | Address ($N_{00}+N_7$) | Data ($D_{10}$) | Address ($1304+N_7$) | Data ($D_{11}$) |
|---|---|---|---|---|
| 0 | 1300 | 30 | 1304 | 10 |
| 1 | 1301 | 32 | 1305 | 20 |
| 2 | 1302 | 34 | 1306 | 30 |
| 3 | 1304 | 36 | 130 | 40 |

Then, in decision step 414, the count data $N_7$ is compared with the last count (=3). When the value of the count data $N_7$ is less than 3, the program goes back to step 412. At this time, the running phase data $N_7$ is incremented by 1 in a process step 416. Thereby, in the series of steps 412 and 414, the checking program is executed for data $D_{10}$ (=32) and $D_{11}$ (=20). The series of steps 412 to 416 is repeatedly executed until the count data $N_7$ reaches 3; i.e., the series of step 412 to 416 will be repeated four times. When the value of the count data $N_7$ is 3 and the step 414 determines that the data $N_3$ (=3) matches with the last count number (323), the program goes to END. At this time, the data $D_{11}$ (=10, 20, 30, 40) is written to the output circuit provided in addresses $D_{10}$ (=30, 32, 34, 36). Outputs which correspond to the data value $D_{11}$, is outputted to the measured means. By the measuring means, each output is measured. The result of measurement is compared with corresponding data $D_{11}$ to check whether the result is matched with the data $D_{11}$. When, all the results are matched with respective corresponding data values $D_{11}$, it indicates that the function of the output unit is correct, and otherwise it indicates that the output unit is damaged in one or more bits.

It should be appreciated that the value of data $D_{11}$ may be changed to any value. However, it seems preferable to change the value of data $D_{11}$ to 00000000, 11111111, 01010101 or 10101010, if eight bits of data are used. Thus, shorting between the bits can be checked as well as the function of output unit.

Figure 16:
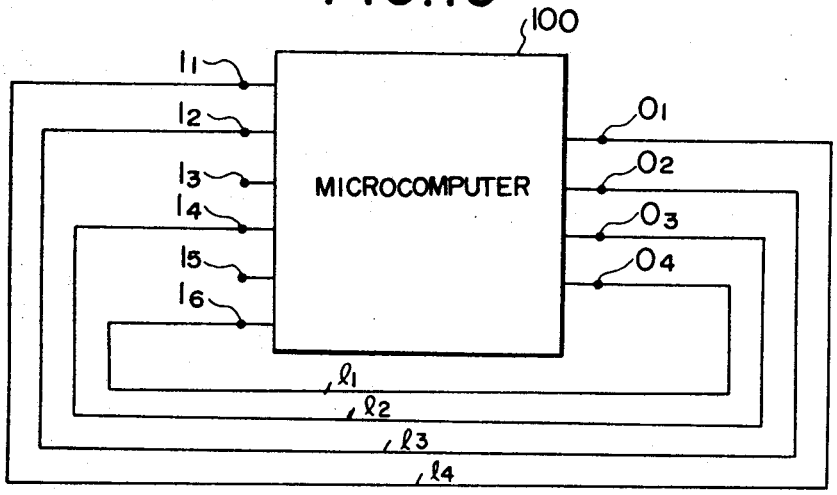
FIG. 16 is a schematic illustration of one example of connection between the input unit and the output unit in case of using the input unit for inputting [datas] *data* to the output unit for execution of the output checking program of FIG. 15.

Although, as disclosed hereabove, the function of the output unit can be checked by use with the measuring means outside of the control system, it will be possible to check the output unit in use with the input unit. This maybe preferable as it requires no measuring means to be provided outside of the system. FIG. 16 shows, as an example, a preferred structure of checking means for checking the output unit. A control unit 190 comprises an input unit, a CPU, a RAM, one or more ROM's and an output unit. The input unit is provided with a plurality of input terminals $I_1$ to $I_6$. The output unit is provided with a plurality of output terminals $O_1$ to $O_4$. The input terminals $I_1$, $I_2$, $I_4$ and $I_6$ are respectively connected to the output terminals $O_1$ to $O_4$ through lines $1_1$ to $I_4$. For the purpose of explanation only, from the output terminal $O_1$ is outputted an output signal in the form of a variable frequency signal; from the terminal $O_2$ is outputted an ON-OFF signal; from the terminal $O_3$ is outputted a variable pulse width signal; and, from the terminal $O_4$ is outputted an analog signal. Corresponding to the output signal outputted from each corresponding output terminals, the input terminal $I_1$ allows a frequency signal to pass; the terminals $I_2$ and $I_3$ allow an ON-OFF signal to pass; the terminal $I_4$ allows a pulse signal to pass; and, the terminals $I_5$ and $I_6$ allow an analog signal to pass. As mentioned above, if the number of input terminal is more than the number of output terminals, and the kinds of signal to be passed through the input terminals include all the kind of signals to be outputted from the output terminals, each output terminal will be simply connected to corresponding terminals. When the output terminal is connected to an input terminal which allows a different kind of signal to pass and can not allow the output signal outputted from the output terminal to pass, it is necessary to dispose a converter for adapting the output signal to the input signal to be passed through the input terminal. For example, if the output signal is a variable frequency signal, while the input terminal allows only analog signals to pass, it will be necessary to dispose a frequency-analog converter between the terminals. If the number of output terminals is more than the number of input terminal, a signal option device such as a multiplexer channel unit, will be provided so as to input different output signals to one input terminals by time sharing. For checking whether the output signal is identical to the data written in the output circuit, the programs shown in FIG. 17 will be linked with the program for checking the input unit as shown in FIG. 6, for example. In this case, the data written in the output circuit is outputted as an input signal of the input unit. In the input unit, the output signal forwarded from the output unit is stored and read out to check whether the data contained in the signal is identical to the data $D_{11}$ with reference to a reference signal. It should be appreciated as matter of course that the reference data to be compared with the output signal is previously adapted to the data $D_{11}$ corresponding to the output signal. It will be also appreciated that by checking the output unit by the latter method, it can also check the input unit, and if the input unit is damaged the output data transmitted from the output unit and stored in the input unit may not match the reference data. If an error occurs on checking whether the input unit or the output unit is damaged, either unit should be checked again by the foregoing individual checking methods. If there is a time lag between operations of the output unit and the input unit, it is recommendable to provide a delay circuit between the units for increasing the accuracy of checking. Further, it is preferable to arrange the data for checking the output unit so that in all bits of both of the output circuit and the input unit, 0 and 1 can both be written. Thus, shorting between the bits as well as checking of functions of the unit can be checked. It will be also recommendable to provide in the reference data a range corresponding to allowable range of the input and output units.

When the input unit and the control program is checked, as mentioned hereabove, the checking can be done by inputting a given input signal to the control system and checking outputs as a results of operation of the control system. However, if some error is detected during the above checking operation, it is impossible to distinguish whether the error is caused by errors of the input unit or an error of the program or operation of the micro-computer. For avoiding such inconvenience, it is preferable to determine the input data for executing the control program in use with the checking program. As an actual way of checking the control program and the CPU executing the control program, only data for executing the checking program is given and inputted, and at this time, the input signal forwarded from the input unit is not used for checking. In this way, even when the input unit is in error and therefore it cannot input correct data to the CPU, the control program and the CPU can be checked. Further, when the input unit includes an analog circuit for receiving analog input signal, $X_{10}$, or a frequency signal circuit for receiving frequency signal, conversion errors caused by non-uniform signals, quantizing errors, etc. will not affect the checking operation of the control program. Thereby, the checking of the control program can be made without being affected by problems in the input phase, and the result of checking will be quite reliable.

Now we explain how to output the results of checking. It should be noted that the hereafter disclosed method of outputting the results of checking will be applicable to checking the input unit, the RAM, the ROM, the CPU and the output unit. At first, the simplest way to output the results is to provide a special output unit for outputting the checking results only. The special output unit will change the output in response to an OK signal or NG signal provided thereto during running or executing the checking program. This method is advantageous in not affecting the output for controlling the vehicle driving or vehicle equipment. However, this requires an increase of the output circuit which causes an increase of cost of the control system. For reducing the number of output circuits and thereby reducing the cost, one or more of the output circuits will be used in common for outputting checking result as well as for outputting control signals. In order not to affect, or to affect as little as possible output of the control signal and for controlling vehicle driving and other equipment, one or more output circuit, for outputting control signals for warning indicators or indication devices may be advantageously used for outputting the results of checking. Since such indicators are provided for the purpose of warning of erroneous operation of some element of the vehicle or indication of the condition of some feature, it will not affect actual driving or operation of other vehicle equipment. Further, by use with an output circuit as an indicator, the result of checking can be indicated visually, for example. Other output circuit, for example circuits for outputting a control signal to control engine driving, should not be used for outputting the checking results, as they may possibly cause a malfunction of the driving system. However, if the control unit is checked independently or separately from actual control of the driving system or of other vehicle equipment, it might be possible to use the output circuit thereof as the output circuit for outputting the checking results.

For outputting the checking result both in cases of using the output circuits for indicator or other elements, it is preferable to output the result within a substantially short period to avoiding affecting vehicle control, or reduce such effect as much as possible. Since, a variation of the intensity of an indicating lamp or light emitting diode in response to a variation of power over a period of several milliseconds cannot be visually detected, and since a relay circuit or electromagnetic valve etc. will not respond to such variation of power within several milliseconds due to the response delay, an electrical measuring device may be employed to be responsive to such a change of power even if the change occurs within a substantially short period. When the checking results are NG, the output is inverted for a short time period. By this, problems in the control system can be indicated without varying the output thereof. Further, when outputting the checking results, it is preferable to indicate other information of the checking result in addition to OK or NG; for example, what element of the control system is in error. In case of checking the ROM and RAM simultaneously, and when either one of the ROM and RAM is in error, the checking result is indicated as NG. For maintainance of the element, the control unit will obviously prefer to know what element should be repaired for making maintainance easy. When the control unit includes a plurality of ROMs and a notification is made as to which ROM is in error, it will possible to replace the bad ROM. This may result in reducing time and expense for maintenance thereof. When a plurality of input circuits are contained in the unit, it will also be convenient to be notified which input unit is in error. For indicating which element is malfunctioning, a number is associated with each element of the control system or each checking program.

Figure 17:
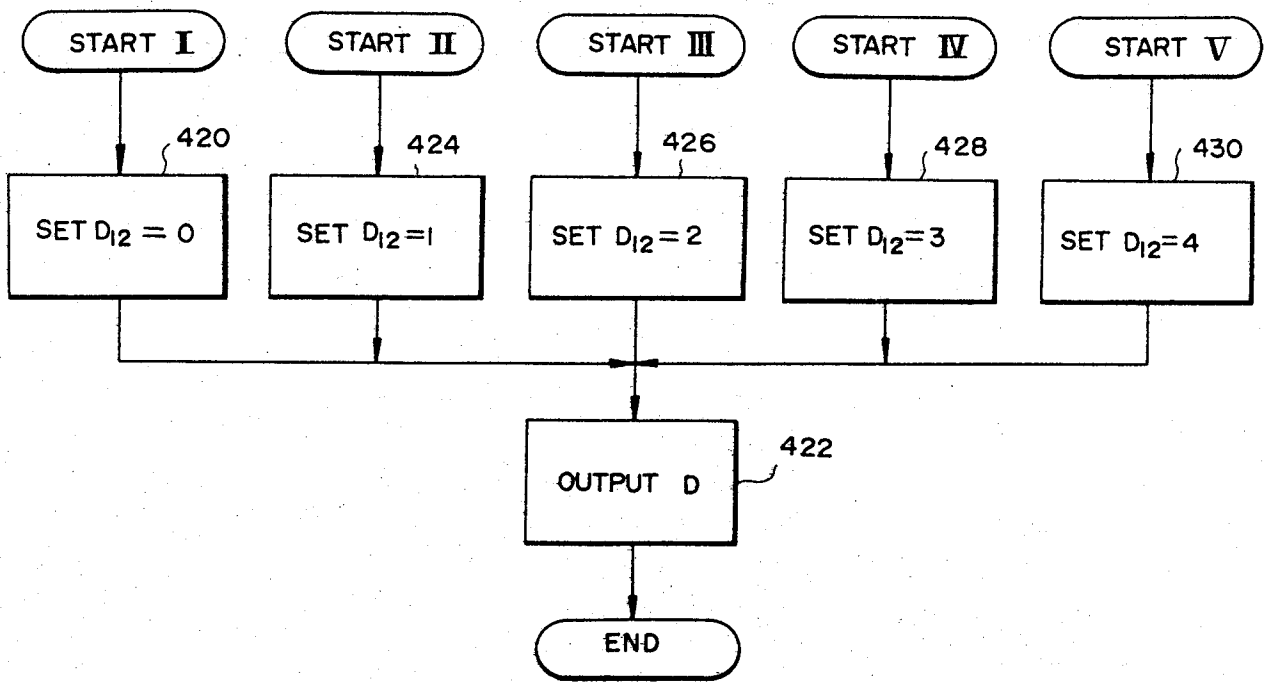
FIG. 17 is a schematic flowchart of a program for selectively outputting the result of the checking.

FIG. 17 shows an example of outputting the result of checking with information as to which element is in error. When the checking results with respect to all the elements are OK, the program starts at START I. When the program starts at START I, output data $D_{12}$ is reset to 0 in process step 420. The output data $D_{12}$ is outputted in process step 422. It will be appreciated that the method of outputting the checking result is substantially the same as previously explained with reference to FIGS. 15 and 16. When the input unit is in error and during execution of the input unit checking program, an NG signal is generated, and the program starts at START II. In this case, in process step 424, the output data $D_{12}$ is set to 1. In step 422, the data $D_{12}$ (=1) is outputted. Thereby, when the indicator indicates 1, it indicates that the input unit is in error. When the RAM is in error and during the RAM checking program an NG signal is generated, the program starts at START III. In process step 426, the output data $D_{12}$ is set to 2. The data $D_{12}$ (=2) is outputted to indicate that the RAM is in error, in step 422. When the ROM is in error and during ROM checking programan NG signal is generated, the program starts at START IV. In process step 428, output data $D_{12}$ is set to 3. The data $D_{12}$ (=3) is outputted in step 422 to indicate that the ROM is in error. When the output unit is in error and an NG signal is generated during execution of the output unit checking program, the program starts at START V. In process step 430 the output data $D_{12}$ is set to 4. The data $D_{12}$ (=4) is outputted in step 422 to indicate that the output unit is in error. Thereby, data $D_{12}$ is outputted to a measuring means provided outside of the control system. Thereby, whether the control system operates correctly and further, if there is an element in error, which element is in error, can be indicated. If desired, the output data $D_{12}$ containing a combination of information can be indicated by some number representation. Although in the above-explained example uses specially arranged numbers for indicating which element of the control system is in error, it is possible to indicate the element in error by use of the address of the element in error. For example, for the address 10 of the input unit, the output data $D_{12}$ is set to 10 on the step 424. Further, if desired, together with the output data $D_{12}$ having a value corresponding to the address of the element in error, the contents of the address can be outputtted for convenience in seeking the cause of trouble.

When some element of the control system is in error, it is undesirable to keep the vehicle under the control of such a control system. It is preferable to indicate such a situation of the control system or cease operation of the control system, otherwise the vehicle may possibly be subject to danger. For indicating the problem with the control system, the output signal which is the result of checking can be used. It is also possible to vary the output to vary the warning condition to indicate what problem has arisen in the control system. The control program may be stopped by, for example, executing another program which is structured to loop so as not to output any output signals. It will also be possible to stop the vehicle by stopping the fuel supply or stopping the ignition, for example, in response to the output of the checking program.

Although as mentioned above, when the control system malfunctions, the vehicle may be protected from danger by stopping the control system or stopping the vehicle however, this procedure is not generally desirable as great inconvenience will be caused by malfunctions of the control system. For preventing such a drawback or disadvantage, it will be preferable to provide auxiliary elements in the control system which can replace malfunctioning elements. Generally some elements of a control system including a microcomputer unit for application to an automotive vehicle are capable of replacement when malfunctions of elements are detected on initial checking before the system is coated for the purpose of water or liquid proofing, but it is quite difficult to replace the elements after they have been encapsulated. Meanwhile, the elements employed in the control system, such as the ROM and the RAM, generally have an input so called chip-select for selecting the element. Therefore, it is possible to incorporate auxiliary elements so as to automatically replace the elements malfunctioning in response to the result of checking, by using the chip-select input. Thus, even if some element in the control system malfunctions, the control system can maintain correct operation in order to control the vehicle driving system and the other equipment. For example, when the ROM holding the control program malfunction, the output of the checking result of the ROM is inputted to the chip-select input thereof and the inverted output is inputted to the chip-select input of the auxiliary ROM. Thus, the faulty ROM is disconnected and replaced by the auxiliary ROM to maintain control of the control system for the vehicle driving system and the other vehicle equipment. With respect to the input and output units, there will be provided a plurality of circuits which are selectively used for inputting or outputting signals. For selecting the circuit, there will be further provided a relay-gate circuit to selectively connect the input or output circuit to the arithmetic operation unit of the control system. Further with respect to the output unit, when elements of the control system other than the output unit malfunction, the output unit can not output a correct control signal, even though the output unit itself is operating normally. In this case, it will be desirable to maintain output control signals by inputting the control data to the output unit from another control system. For example, for an ignition control system, when the control program for ignition control makes an error because a sensing element for detecting or measuring spark timing is damaged, as a replacement thereof, an auxiliary program for outputting a fixed control signal will be executed. Meanwhile, for a fuel control system, when the sensor for engine temperature or an input circuit for inputting an input signal of engine temperature is damaged, the fuel control program must be modified to stop correcting operation in response to engine temperature or to fix the input data for the engine temperature.

It will be appreciated that when the ROM is damaged, it is sometimes impossible to modify the control program. In this case, it will be preferable to change to a circuit which can generate a fixed output or to replace the control system of an other arithmetic unit which has the function of executing simple arithmetic operations.

Next, we refer to starting operation of the check program and a method for starting a plurality of checking programs, as subroutines of a program. As starting instructions for execution of the checking program, interrupt signals are preferred. In general, a microcomputer unit is provided with inputs for interrupt signals. These interrupt signals may be generated in response to input signals from the sensor used for detecting and measuring various vehicle driving parameters. When an interrupt signal is inputted, the executing program or subroutine is stopped and an interrupt processing routine is executed. If the interrupt processing routine is executed to execute the checking program interrupting the control programs, a decision program to decide whether to allow the interruption by the checking program will be unnecessary. Therefore, in this case, the control programs and the checking programs can be structured independently of one another to make programming easy and thereby each program can be simplified to shorten the duration thereof. The interrupt signals may or may not be capable of being masked or inhibited. If the interrupt signal is capable of being masked or inhibited, it will be possible to continue the control program or other checking program if it is in the interrupt, inhibit or masked state. Thereby the checking program can be executed only when the execution of the checking program will not affect the control system or vehicle driving; for example, when the engine is stopped or the vehicle is parked or stopped. Thus, even if an interrupt signal is generated and inputted due to noise or malfunction while the control system is operating to control vehicle driving, as the control program is in the masked state, the checking program is not executed. Meanwhile, if the interrupt signals are not capable of being masked, it will be preferable to give the checking program priority for interruption. Since the checking program is started in accurate synchronism with the inputted interrupt signal, the synchronization of the programs can be easily controlled.

When there are several checking programs to be executed, the interrupt priority will be determined in response to the combination of input signals. For example, if there are two digital signals, four checking programs can be controlled by the associated interrupts. In a control system with an interrupt system, the interrupt signals are variously combined to control the interrupt priority of each checking program. It is recommendable to include a program to stop execution of the checking program. Such a stopping program is useful when the interrupt signal cannot be masked so as to prevent the control system from malfunction even when such an interrupt signal is inputted due to error. Thereby, the control such as interrupt signal is inputted due to error. Thereby, the control system is reliable with respect to execution of the checking program, particularly to execution timing of the checking program.

Figure 18A:
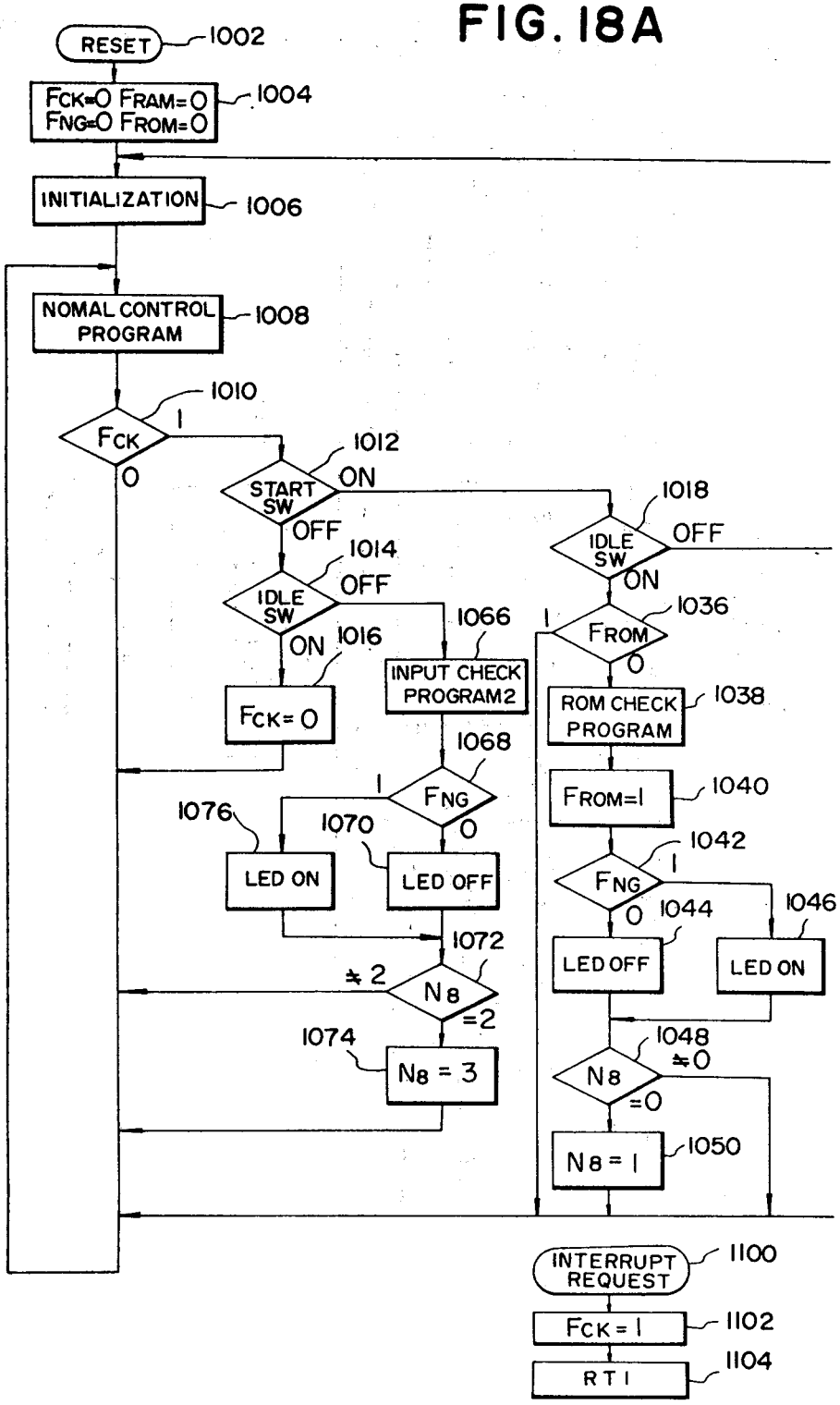
FIGS. 18(A) and 18(B) are flowchart of one example of a checking program having subroutines for checking the input unit, the ROM and the RAM as interrupt subroutine of a vehicle device control program, in which a flow line between the checking routines for RAM and ROM is illustrated in common for preserving continuity of the flowchart between FIGS. 18 (A) and 18 (B).
Figure 18B:
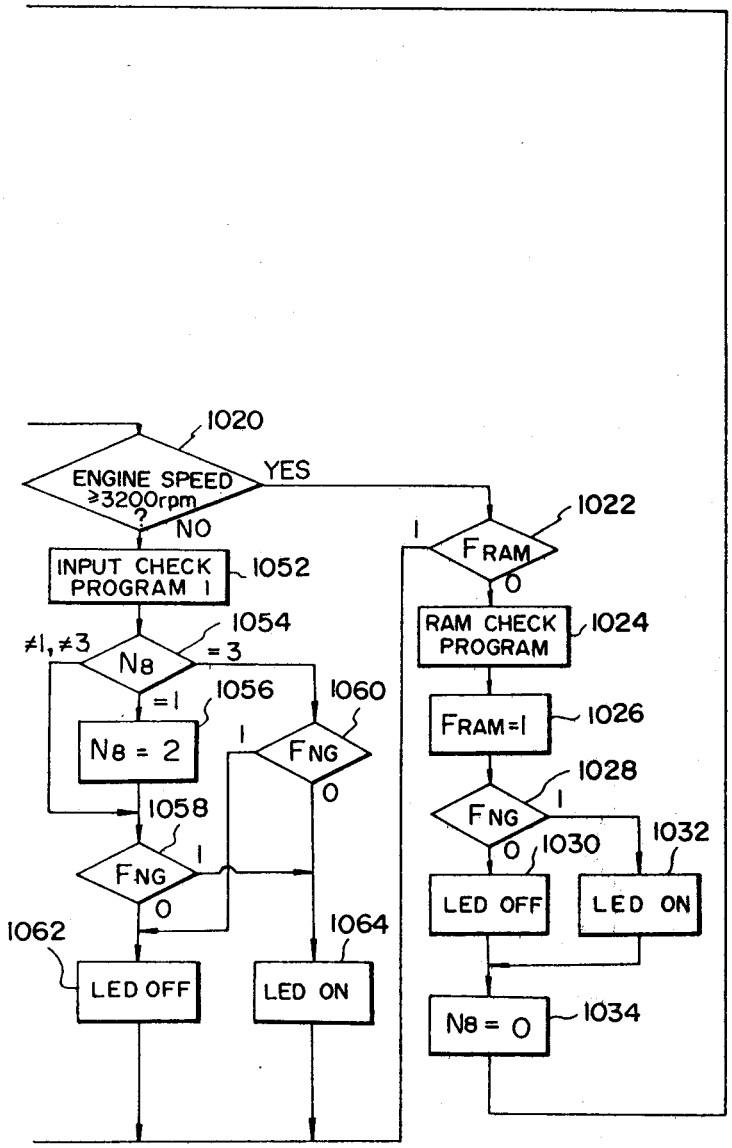

FIG. 18 shows an example program having several checking programs as subroutines. When the power for the control system goes on, power-on reset 1002 is actuated. In process step 1004, flags $F_{CK}$, $F_{NG}$, $F_{RAM}$, $F_{ROM}$ are reset to an initial condition. In this example, all the flags are reset to 0 for simplification of description. In process step 1006, each signal is set to its initial value. Thereafter, in step 1008, the control program is executed. Although the control program executing step 1008 is illustrated as a single block, it will be easily understood that the control program may be structured in various steps. Further, it should be appreciated that the control program often includes various subroutines for executing various control operations therein. However, this is not so closely relatedly to the concept of the present invention and for simplicity of explanation below, the control program will be explained hereafter as a single block. After execution of the control program in step 1008, the value of the flag $F_{CK}$ is checked in decision step 1010. Normally, the value of the flag $C_{CK}$ is 0. When the value of the flag is 0, the program goes back to step 1008 to repeat the control program. Then, if an interrupt signal is inputted uring execution of the control program, execution of the control program is then stopped and control goes to a step 1100. Then, the interrupt processing routine is executed. In process step 1102, flag $F_{CK}$ is set to 1. Thereafter, in process step 1104, control is returned to step 1008 to execute the control program. After execution of the control program, in the decision step the flag $F_{CK}$ is checked and a decision made as to whether to enter the checking program. It should be noted that the flag $F_{CK}$ indicates whether an interrupt signal for executing the checking program has been inputted. In the example shown, when $F_{CK}$ is 1, it indicates that an interrupt signal has been inputted. It will be further understood that, the flag $F_{CK}$ is stored in a specific bit, called a flag bit. At the start of execution of the checking program, first the starter switch is checked to see if it is in the ON position or in the OFF position, in a decision step 1012. When the starter switch is in the OFF position, then an idling switch which closes the throttle completely when ON, is checked in a decision step 1014. When the idling switch is ON, in a process step 1016, the flag $F_{CK}$ is reset to 0 and then control is returned to the control program. The subroutine structured series of steps 1012 to 1016 is provided to avoid a malfunction caused in the control system by inputting an interrupt signal generated by a malfunction of the sensing means. Namely, when the starter switch is in the OFF position, and the idling switch is in the ON position, the vehicle may be decelerating or idling, and these driving conditions arise relatively frequently. If due to a malfunction, the control system operates the checking program during vehicle operation, because the control program is therefore stopped for a short period, the engine may misfire, or behave erractically, and therefore for safety reasons the driver is likely to take his foot from the accelerator pedal. Therefore, it will be convenient to check whether the vehicle is in a position to execute the checking program, by checking the positions of the starter switch and idling switch. Although in the example shown, when the vehicle state with the starter switch OFF and idling switch ON is detected, the interruption program is stopped, and control goes back to the control program for controlling vehicle driving and operation of other vehicle equipment, it will be possible to check whether the vehicle driving condition allows execution of the checking program in other ways (not shown in the drawings). For example, when the vehicle has starter switch OFF and the idling switch OFF, switch positions which arise in normal driving, the interrupt subroutine or program may be stopped with control going back to a position executing the control program. Such switch positions indicate a normal driving state of the vehicle and at this time the checking program may not be desired to be executed to prevent error or stopping of control operation of the vehicle driving system or other equipment.

For avoiding malfunctions, there some further checking steps in the program shown, which will be exlained in detail.

When a decision that the starter switch is in the ON position is made step 1012, the position of the idling switch is checked in decision step 1018. When the idling switch is OFF, engine torque is checked. In step 1020, a check is made whether the engine torque exceeds 3,200 rpm. When a decision is made that the engine torque exceeds 3,200 rpm in the step 1020, flag $F_{RAM}$, indicating whether the RAM checking program has been executed, is checked in decision step 1022. If the value of flag $F_{RAM}$ is 0, then the RAM checking program is executed in process step 1024. The structure of the RAM checking program is one of the foregoing RAM checking programs which have been illustrated with reference to FIGS. 8 and 9. During execution of the RAM checking program, the function of the RAM, writing data and reading out the same, is checked and also whether there are bits shorting with adjacent bits is checked.

Thereafter, the flag $F_{RAM}$ is set to 1 in a process step 1026. Once the value of the flag $F_{RAM}$ is 1 which indicates that the RAM checking program has been executed, then, when the program step comes to step 1022 again, a decision to return from the interrupt is made in the step 1022 and control goes to step 1008 where the control program is executed. Namely, since checking of the RAM need not be repeated, once the RAM checking program is executed, further execution of the RAM checking program is prevented to avoid unnecessarily long execution of the checking program. In decision step 1028, the result of execution of the RAM checking program in step 1024 is checked. The result of the RAM checking is indicated by the value of flag bit $F_{NG}$; i.e., if the flag $F_{NG}$ is 0 it indicates that the function of the RAM is correct, while the flag $F_{NG}$ is 1 it indicates that the RAM is malfunctioning. In the program shown, merely whether the function of the RAM is correct is checked; namely whether the value of the flag $F_{NG}$ is 0 or 1. However, as stated above, it will be possible to further check what kind of problems are occurring in the RAM or what address is faulty, if the result of the RAM checking is NG. When the flag $F_{NG}$ is 0; i.e., the result of the RAM checking is OK, in process step 1030, an indicator for indication of the result of the checking program goes OFF. It will be appreciated that, as stated before, various vehicle indicators can be utilized for indication of the checking results. However, in the example shown, a visible warning means, such as a light emitting diode, is provided for indication of the checking result for the purpose of simplification of explanation. When the result of the RAM checking is NG and thus the value of the flag $F_{NG}$ is 1, the indicator is turned on in process step 1032. Thus, when the RAM checking result is NG, it can be indicated by turning on an indicator. Thereafter, in a process step 1034, counter $N_8$ which indicates the run number of the checking program and also indicates the order of subroutines, in set to 0. In the example shown, the subroutine structure of a series of steps 1022 to 1034 is executed before other subroutines. Since the RAM holds data to be used for checking other elements of the control system, such as input unit, the ROM and output unit, it will be preferable to check the RAM first. However, it should be noted that the order of checking is not always required to start from the RAM, and therefore, the example shown should be understood as merely an example for illustration of the present invention. After setting the value of counter $N_8$ to 0, control goes back to step 1006.

In step 1018, when the idling switch is in the ON position, then the ROM checking subroutine is executed. First in a decision step 1036, flag $F_{ROM}$ which indicates whether the ROM checking program is already executed is checked. Since the flag $F_{ROM}$ is reset to 0 in step 1004, the flag $F_{ROM}$ indicates 0 on the first time. Then, the ROM checking program is executed in a process step 1038. Although FIG. 18 shows the ROM checking program as a single block for simplification of explanation, it should be understood that there are included various steps for executing the ROM checking program. Actually, checking of the ROM is performed by either of the checking programs illustrated in FIGS. 10, 11, 13 or 14. After execution of the ROM checking program, the flag $F_{ROM}$ is set 1 to prevent repeatedly executing the ROM checking program for the same purpose as stated above in the RAM checking, in process step 1040. In decision step 1042, the result of the ROM checking is checked. The result of the ROM checking is contained in the flag bit $F_{NG}$ thus: when the function of the ROM is correct, the value of the flag $F_{NG}$ is 0, while if the ROM is damaged or troubled, the flag $F_{NG}$ is of value 1. When the function of the ROM is correct and thus the value of flag $F_{NG}$ is 0, the indicator is turned in OFF on a process step 1044. If the ROM is faulty and thus the value of flag $F_{NG}$ is 1, the indicator is turned to indicate visually that there is a fault in the ROM. Thereafter, in decision step 1048, the counter $N_8$ is checked. When the value of the counter $N_8$ is 0, the counter $N_8$ is set to 1 in step 1050, while if the value of the counter $N_8$ is larger than 0, the program goes immediately back to step 1008.

In step 1020, when the engine torque is less than 3,200 rpm, an input unit checking program I is executed through an input unit checking subroutine. As will be apparent from FIG. 18 and as different from the RAM and ROM checking subroutine, there is not provided a step for checking whether the input unit has already been checked by execution of the checking program I. The reason is that, since, in the case of inputting input data through and A/D convertor, for example, by time sharing, when a plurality of input data values are inputted to the input unit, it takes a comparatively long period and it may possible be that some data is inputted during or after execution of the input checking program; thus it is preferable to check the input unit repeatedly. It will also be seen from FIG. 18, that there are two different input unit checking programs; i.e., input unit checking program I and II. These input unit checking program I and II are provided to check the input unit twice in different driving conditions of the vehicle. Checking program I is executed under the vehicle conditions: starter switch on, idling switch off and engine torque less than 3,200 rpm, i.e. vehicle is idling, and the checking program II is executed under the driving conditions: starter switch off, idling switch off, i.e. the vehicle is parked or stopped. However, it is not always necessary to check the input unit twice as specified above, and it is of course possible to check the input unit one time in one vehicle condition adapted for execution of the checking program. Step 1052 may include various steps, and checking program I may be structured as illustrated FIG. 6.

During execution of the input unit checking program, the flag $F_{NG}$ is set to 0 when the function of the input unit is correct and to 1 when the function of the input unit is incorrect and the unit is considered as faulty. Next, the counter $N_8$ is checked in decision step 1054. The value of the counter $N_8$ is incremented by 1 and thus becomes 2 in step 1056. Thereater, the value of flag $F_{NG}$ is checked in decision step 1058. When the value of the flag $F_{NG}$ is 0 and therefore a decision is made that the function of the input unit is correct, the indicator is turned off in a process step 1062, while, when the value of the flag $F_{NG}$ is 1, the indicator is turned on in a process step 1064. Then, in decision step 1054, the counter $N_8$ is checked. When the value of the counter $N_8$ is 1, the counter $N_8$ is incremented to 2 in a process step 1056, whle when the value of the data $N_8$ is 3, the value of flag $F_{NG}$ is checked in a decision step 1060. Thereafter, the program goes back to step 1008 to execute the control program. In decision step 1054, when the counter $N_8$ contains a value other than 1 or 3, the program jumps the step 1056 and goes to the decision step 1058. In this case, the value of the data $N_8$ is either 0 or 2. When the value of the data $N_8$ is of 0, it means that either or both the RAM and ROM have not yet been checked. Therefore, the result of checking with respect to the input unit is not reliable. When the value of $N_8$ is 2, this indicates immediately after checking the input unit by the input checking program I. Therefore, it is unnecessary to change the value of the data $N_8$. Then, as mentioned above, in step 1508 it is decided whether the function of the input unit is correct by checking the flag $F_{NG}$, and when the value of the flag $F_{NG}$ is 0, the indicator is turned off in process step 1062. If the value of the flag $F_{NG}$ is 1, and it is decided that the input unit is faulty, the indicator is tuned on to light an indicator lamp, for example to inform or warn of the fact in a process step 1064. When, in the decision step 1054 it is decided that the counter $N_8$ is 3, the value of the flag $F_{NG}$ is checked whether it is 1 or 0 in decision step 1060. When the result of the checking is that the flag $F_{NG}$ is 0, i.e., the function of the input unit is correct, the indicator is turned on in the process step 1064. If the value of the $F_{NG}$ is 1 in the step 1060, the indicator is turned off in process step 1062. In both cases, after executing the job, the program goes back to step 1008. It will be appreciated that, the decision steps 1058 and 1060 which are both check steps after performing a checking operation as to whether the value of the flag $F_{NG}$ is 0, have alternating functions in operating the indicator. This is so because when the checking subroutines for checking each element of the system are executed in a given order, all the elements function correctly. The execution of the checking program is finished after execution of input unit checking subroutine in the sequence of steps 1054-1060-1062 or 1064. Namely, it is intended in the example shown that the checking is performed in the order RAM checking subroutine - ROM checking subroutine - input unit checking subroutine I-input unit checking subroutine II - input unit checking subroutine I. When the functions of all the elements are correct, the indicator is kept in off until the final input unit checking subroutine.

In decision step 1014, if the decision is made that the idling switch is in the OFF position, i.e., the vehicle is in the normally driven state, the input unit checking program II is executed in proces step 1066. As will be easily understood, the checking program II may contain various steps and perform checking of functions of the input unit with respect to input data which has different input conditions from the input data for the input unit checking program I. During execution of the input unit checking program II in step 1066, the value of the flag $F_{NG}$ is changed to 0 or 1 corresponding to the result of checking. The value of the flag $F_{NG}$ is checked in decision step 1068. When the value of the flag $F_{NG}$ is 0, the indicator is turned off in process step 1070, while when the value of the flag $F_{NG}$ is 1, the indicator is turned on in process step 1076. Thereafter, the counter $N_8$ is checked in decision step 1072. When the data $N_8$ is 2, the value is incremented by 1 and thus the counter $N_8$ becomes 3. If the value of the data $N_8$ is other than 2, the program goes back to step 1008.

It will be understood the input unit checking subroutine II of sequence of steps 1066 to 1076 may be substituted by a subroutine for checking the output unit by way of substitution of the step 1066 from the input unit checking program II for the output unit checking program.

For performing the above-mentioned checking operation in the given order, input data will be arranged so that the input data indicates each vehicle driving condition in which the checking programs are executed in order. Thus, the indicator is operated in the given order, i.e. it indicates whether each function is correct in the order: RAM- ROM-input unit (checked by program I)-input unit (checked by program II)-input unit (checked by program I). Meanwhile, it will be possible to detect trouble or damage caused in the indicator itself or circuit of the indicator by observing the change between on and off, since if the indicator and circuit thereof is correct, the order of lighting of the indicator corresponds to the given order of checking. Further, it will also be possible to detect faults in the input circuit by inputing signals to execute checking programs with respect to signals. For example, when the input circuits are faulty, and the input signal are kept in a state indicating start switch on and idling switch on, only the ROM checking program is executed. In this case, when the function of the ROM is correct, the indicator is kept off. At this time, the operation of the indicator is different from normal and can indicate the problem in the input circuit, since the indicator functions alternately during execution of the final phase of the checking programs. However, it is also possible to indicate the result of the checking with a plurality of indicators receiving various output signals to indicate the result with respect to each element or with an indicator capable of varying the output pattern to indicate different results of checking with respect to each element. Thus, it will be advantageous to use as indicator and single output pattern in view of the ease of observing the results and cost of the system.

It will be noted that, in the example shown, after the execution of the RAM checking subroutine, control goes back to step 1006 to reset to the initial condition all the data values so as to clear the data stored in the RAM for the purpose of avoiding errors in execution of the control program due to reading out such checking data and operating control on the basis of such data. Meanwhile, at this time, if the program goes back to the first step 1002, the counter $N_8$ and the flag $F_{NG}$ are cleared, it causes the checking program to go back to the initial condition so as to loop and not proceed to next phase. It is further preferable that data for deciding what checking programs should be executed, is inputted to the CPU from the input unit, since for execution of the checking program, the data stored in the RAM is apt to be rewritten.

As mentioned in the example shown in FIG. 18, such a means for inputting input signals to the control system and thus for executing the checking program can be embodied relatively simply and, by use of such checking means, the control system can be easily checked even after it has been assembled. The means will be installed in a service station or mounted in a vehicle to check the control system easily.

The present invention, as illustrated above, can provide various and considerable advantages such as:

the functions of the control system can be checked even after being assembled or mounted on the automotive vehicle, and it may be checked in the vehicle without change of the control condition of the vehicle;

duration of execution of the checking program can be considerably and remarkably reduced;

all the functions of the control system can be checked, perfectly;

since, if desired, the information as to which element is faulty can be provided, it is convenient for looking for the faulty portion of the control system, mending or replacing the same and thus help reducing time for mending or replacing operation;

since it will be possible to replace the element or swith or the circuit which is faulty with an auxiliary element or circuit in response to the reslt of checking, it can increase durability of the control system;

since the control system can be checked easily even after the vehicle mounting the same is actually driven, the vehicle can be effectively protected from serious failures or accidents due to the problems with the control system; and the checking can be quite easily performed in a service station having the checking means.

While the present invention has been shown and described with respect to the preferred embodiment, it should not, however, be considered as limited to these or mere and simple generalizations, or other detailed embodiments. Further, variations could be made to the form and the details of any parts or elements, without departing from the principles of the invention. Therefore, it is desired that the scope of the present invention, and the breadth of the protection sought to be granted by Letters Patent, should be defined solely by the accompanying claims.

What is claimed is:

1. In a control system for an automotive vehicle for controlling various devices in response to sensor signals fed from sensors, said system having a microcomputer for receiving and processing said sensor signals and for controlling said devices, said microcomputer including an input unit, an output unit, a CPU, and a memory storage device including a ROM and a RAM, a method of controlling said vehicle and checking operation of said microcomputer comprising steps of:

(a) operating a control program in said microcomputer in response to said sensor signals for controlling said vehicle devices, (b) determining in said CPU and in response to said sensor signals at least a first and a second engine condition, (c) in response to said first determined engine condition, operating a first checking program for checking operation of said memory storage device, operation of said first checking program including the steps of:

(i) in said RAM, feeding into said RAM a first plurality of data signals corresponding to a first set a data values, (ii) reading out of said RAM said fed-in data signals, (iii) comparing each of said read out data signals with each of said first plurality of data signals and generating a first error signal upon non-equivalence of same, (iv) providing an indication of said first error signal, (v) in said ROM, reading a second plurality of data values from storage locations of said ROM, (vi) comparing at least the least significant bits of the sum of said read data values with a reference sum and generating a second error signal upon non-equivalence thereof, (vii) providing an indication of said second error signal, (d) in response to said second determined engine condition, operating a second checking program for checking operation of at least one of said input and output units, said second checking [progrom] *program* including the steps of:

(i) for said input unit, feeding into said input unit a third plurality of data signals corresponding to a third set of data values, (ii) comparing in said CPU said third set of data values with one set of reference values stored in said memory storage device, (iii) generating a third error signal if each of said third set of data values is not equal to each of said one set of reference values, (iv) providing an indication of said third error signal, (v) for said output unit, feeding a fourth plurality of data signals corresponding to a fourth set of data values from said memory device to said output unit, (vi) comparing said fourth set of data values with another set of reference values, (vii) generating a fourth error signal if each of said a fourth set of data values is not equal to each of said other set of reference values, and (viii) providing an indication of said fourth error signal.

2. The method recited in claim 1 wherein said one set and another set are identical.

3. The method as recited in claim 2 further including the step of operating said second checking program for checking both said input and output units.

4. The method as recited in claim 3 further including the steps of feeding output signals from said output unit to said input unit for simultaneously checking operation of said input and output units by comparing, in said CPU, data fed to said output unit with data received by said input unit.

5. The method as recited in claim 1 wherein the second checking program in step (d) is preformed after execution of said first checking program in step (c).

6. The method recited in claim 1 wherein said vehicle has a starter switch and said first engine condition corresponds to the starter switch being ON, and said second engine condition corresponds to said starter switch being OFF.

7. The method as recited in claim 6 wherein said vehicle sensors include an idle speed sensor and an engine RPM sensor and said first checking program is divided into a first, RAM checking program, the operation thereof including steps (c)(i)-(c)(iv), and a second, ROM checking program, the operation thereof including steps (c)(v)-(c)(vii), said method further including the steps of:

(a) performing said RAM checking program in reponse to said idle switch being OFF and said engine RPM being above a predetermined value, and (b) performing said ROM checking program in response to said idle switch being ON.

8. The method as recited in claim 1 wherein said steps of providing an indication of said first, second, third and fourth error signals include the steps of providing a visual indication of same.

9. The method as recited in claim 1 or 8 wherein a single indication is provided for said first, second, third and fourth error signals.

* * * * *